US012060710B2

(12) United States Patent
VanHoose et al.

(10) Patent No.: US 12,060,710 B2
(45) Date of Patent: Aug. 13, 2024

(54) METHOD OF FORMING A CONCRETE PANEL

(71) Applicant: Innovative Design Solutions LLC, Loudon, TN (US)

(72) Inventors: Jeff VanHoose, Loudon, TN (US); Don Atkins, Louisville, TN (US)

(73) Assignee: EnviroCast, LLC, Loudon, TN (US)

( * ) Notice: Subject to any disclaimer, the term of this patent is extended or adjusted under 35 U.S.C. 154(b) by 294 days.

(21) Appl. No.: 17/567,534

(22) Filed: Jan. 3, 2022

(65) Prior Publication Data
US 2022/0220738 A1 Jul. 14, 2022

Related U.S. Application Data

(63) Continuation-in-part of application No. 16/728,620, filed on Dec. 27, 2019, now Pat. No. 11,214,963,
(Continued)

(51) Int. Cl.
*B28B 23/02* (2006.01)
*B28B 1/14* (2006.01)
(Continued)

(52) U.S. Cl.
CPC ........... *E04C 2/382* (2013.01); *B28B 1/14* (2013.01); *B28B 19/003* (2013.01);
(Continued)

(58) Field of Classification Search
CPC ..... B28B 1/14; B28B 19/003; B28B 23/0068; B28B 23/02; B29C 39/10; B29C 65/56;
(Continued)

(56) References Cited

U.S. PATENT DOCUMENTS 1,718,402 A 6/1929 Bitney
1,929,835 A 10/1933 Awbrey
(Continued)

FOREIGN PATENT DOCUMENTS

DE 19705202 A1 * 8/1998 .......... F16B 25/0026
EP 0127359 A1 12/1984
(Continued)

OTHER PUBLICATIONS

Translation of DE 19705202 A1 (published on Aug. 20, 1998).*
Translation of JP 06136943 A (published on May 17, 1994).*
Translation of JP 2002070298 A (published on Mar. 8, 2002).*

*Primary Examiner* — Leo B Tentoni
(74) *Attorney, Agent, or Firm* — Blanchard Horton PLLC

(57) ABSTRACT

A precast concrete panel and method for forming the panel are disclosed. A method of forming the panel to be used as a floor, wall, or roof structure includes positioning one or more forming members within a casting bed having a plurality of upright surfaces defining a generally rectangular interior area, the one or more forming members comprising an insulating material extending along a length dimension of the one or more forming members to define a plurality of rectangular-shaped channels in a parallel and spaced-apart relationship, placing uncured concrete within the casting bed and allowing the concrete to cover the one or more forming members and substantially fill the channels, and allowing the concrete to cure.

18 Claims, 23 Drawing Sheets

Related U.S. Application Data which is a continuation of application No. PCT/US2018/040014, filed on Jun. 28, 2018, which is a continuation-in-part of application No. 14/610,475, filed on Jan. 30, 2015, now Pat. No. 11,077,583.

(60) Provisional application No. 62/526,101, filed on Jun. 28, 2017, provisional application No. 61/934,405, filed on Jan. 31, 2014.

(51) Int. Cl.
| | | |
|---|---|---|
| *B28B 19/00* | (2006.01) | |
| *B28B 23/00* | (2006.01) | |
| *B29C 39/10* | (2006.01) | |
| *B29C 65/56* | (2006.01) | |
| *E04B 2/58* | (2006.01) | |
| *E04C 2/04* | (2006.01) | |
| *E04C 2/06* | (2006.01) | |
| *E04C 2/288* | (2006.01) | |
| *E04C 2/38* | (2006.01) | |
| *F16B 5/02* | (2006.01) | |
| *F16B 25/00* | (2006.01) | |
| *B29D 99/00* | (2010.01) | |
| *B29L 31/10* | (2006.01) | |

(52) U.S. Cl.
CPC .......... *B28B 23/0068* (2013.01); *E04C 2/044* (2013.01); *E04C 2/288* (2013.01); *F16B 25/0026* (2013.01); *B29D 99/001* (2013.01); *B29L 2031/10* (2013.01); *B29L 2031/108* (2013.01)

(58) Field of Classification Search
CPC ............... B29D 99/001; B29L 2031/10; B29L 2031/108; E04B 2/58; E04C 2/06; E04C 2/46; F16B 5/02; F16B 25/0026
USPC ....... 264/274, 275, 279, 279.1, 333; 29/428; 52/745.09, 745.19, 747.1
See application file for complete search history.

(56) References Cited

U.S. PATENT DOCUMENTS

| | | |
|---|---|---|
| 2,708,780 A | 5/1955 | Burkhalter |
| 2,780,936 A | 2/1957 | Bror |
| 3,287,865 A | 11/1966 | Lockman |
| 3,750,998 A | 8/1973 | Shoe et al. |
| 4,131,405 A | 12/1978 | Moore |
| 4,280,974 A | 7/1981 | Piazza |
| 4,416,842 A | 11/1983 | Nash et al. |
| 4,512,126 A | 4/1985 | Walston |
| 4,782,635 A | 11/1988 | Hegle |
| 4,841,702 A | 6/1989 | Huettemann |
| 4,942,707 A | 7/1990 | Huettemann |
| 4,993,872 A | 2/1991 | Lockwood |
| 5,095,674 A | 3/1992 | Huettemann |
| 5,526,623 A | 6/1996 | Bullivant |
| 5,548,939 A | 8/1996 | Carmical |
| 5,588,272 A | 12/1996 | Haponski |
| 5,956,911 A | 9/1999 | Kistner et al. |
| 5,966,896 A | 10/1999 | Tylman |
| 6,058,672 A | 5/2000 | McClellan |
| 6,125,597 A | 10/2000 | Hoffman et al. |
| 6,427,406 B1 | 8/2002 | Weaver et al. |
| 6,494,004 B1 | 12/2002 | Zimmerman |
| 6,688,073 B2 | 2/2004 | Vanderwerf et al. |
| 7,237,368 B2 | 7/2007 | Richardson et al. |
| 7,654,057 B2 | 2/2010 | Zambelli et al. |
| 7,739,844 B2 | 6/2010 | Gharibeh et al. |
| 7,810,293 B2 | 10/2010 | Gibbar et al. |
| 7,814,710 B2 | 10/2010 | Foglia |
| 7,836,660 B2 | 11/2010 | Gharibeh et al. |
| 8,327,596 B2 | 12/2012 | Drews et al. |
| 8,491,831 B2 | 7/2013 | Buedel et al. |
| 8,561,366 B2 | 10/2013 | Gasperi |
| 8,635,832 B2 | 1/2014 | Heudorfer et al. |
| 8,734,691 B1 | 5/2014 | Boeshart |
| 8,844,227 B1 | 9/2014 | Cluperca |
| 8,966,833 B2 | 3/2015 | Ally |
| 9,238,155 B2 | 1/2016 | Borchardt |
| 9,803,354 B1 | 10/2017 | Francies, III |
| 10,422,133 B2 | 9/2019 | Vanhoose et al. |
| 11,214,963 B2 | 1/2022 | Vanhoose et al. |
| 2003/0115822 A1 | 6/2003 | Lejeune et al. |
| 2005/0086904 A1 | 4/2005 | Foley |
| 2007/0039281 A1 | 2/2007 | Zambelli et al. |
| 2007/0144093 A1 | 6/2007 | Messenger et al. |
| 2008/0016788 A1* | 1/2008 | Gulati ............ F17C 1/00 29/428 X |
| 2008/0041004 A1 | 2/2008 | Gibbar et al. |
| 2009/0301023 A1 | 12/2009 | Heerens et al. |
| 2010/0101175 A1 | 4/2010 | Hohmann |
| 2010/0307083 A1 | 12/2010 | Buedel et al. |
| 2011/0138735 A1 | 6/2011 | Foley |
| 2013/0186698 A1 | 7/2013 | Sarokhan et al. |
| 2015/0217478 A1 | 8/2015 | Vanhoose et al. |
| 2017/0121967 A1 | 5/2017 | Daiber et al. |

FOREIGN PATENT DOCUMENTS

| | | | | |
|---|---|---|---|---|
| GB | 2187446 A | | 9/1987 | |
| GB | 2355024 A | | 4/2001 | |
| JP | 06136943 A | * | 5/1994 | ............ E04C 2/30 |
| JP | 2002070298 A | * | 3/2002 | ............ E01C 13/04 |
| WO | 2010113105 A2 | | 10/2010 | |

* cited by examiner

METHOD OF FORMING A CONCRETE PANEL

CROSS-REFERENCE TO RELATED APPLICATIONS

This application is a continuation-in-part of U.S. patent application Ser. No. 16/728,620, filed on Dec. 27, 2019, now U.S. Pat. No. 11,214,932. U.S. patent application Ser. No. 16/728,620 is a continuation of PCT/US2018/040014, filed on Jun. 28, 2018, which claims the benefit of Unites States Provisional Patent Application No. 62/526,101, filed on Jun. 28, 2017, and is a continuation-in-part of U.S. patent application Ser. No. 14/610,475, filed on Jan. 30, 2015, now U.S. Pat. No. 11,077,583, which claims the benefit of U.S. Provisional Patent Application No. 61/934,405, filed on Jan. 31, 2014. The contents of the foregoing applications are incorporated herein in their entireties by reference.

STATEMENT REGARDING FEDERALLY-SPONSORED RESEARCH OR DEVELOPMENT

Not Applicable

BACKGROUND OF THE INVENTION

1. Field of Invention

The present general inventive concept relates to prefabricated wall structures, and more particularly, to a precast concrete composite wall structure and method for manufacturing a precast concrete composite wall structure.

2. Description of the Related Art

Precast concrete wall structures are often used as a way of avoiding more costly, time consuming, and/or labor intensive processes of fabricating walls from brick or block materials, wood, metal studs, or the like, or fabricating walls by pouring and curing concrete in situ. Generally, the manufacture of a precast concrete wall structure involves the use of a casting bed fabricated to form a mold for pouring and curing concrete in the shape of a desired wall structure. The casting bed is typically oriented with the desired wall structure shape extending in a horizontal plane. Desired non-concrete structural fixtures may be added to the casting bed, and concrete may then be poured into the casting bed, thereby filling the mold shape and at least partially surrounding the fixtures. The concrete may then be allowed to cure, thereby forming a concrete wall structure in the desired shape. Once cured, the wall structure may be removed from the casting bed, such as for example by disassembling the casting bed from around the wall structure. The wall structure may then be transported to a desired location, where it can be stood upright along a substantially vertical plane (or other desired orientation) for use as a structural member in a building construction.

One prior art method for manufacturing a precast concrete wall structure is described in U.S. Pat. No. 8,491,831, issued to Buedel et al. (hereinafter "the '831 patent"). In the method of the '831 patent, a frame is provided having a plurality of spaced-apart wall studs interconnecting opposing first and second wall plate members. The frame is placed within a casting bed extending along a horizontal plane, and a layer of insulating material is positioned overlaying the frame. A plurality of insulating foam blocks are then placed above the insulating layer at spaced apart intervals to define void channels extending therebetween along the length of the casting bed. Lengths of rebar are positioned within the channels, and concrete is poured into the casting bed, thereby filling the channels and surrounding the rebar, covering the insulating foam blocks, and filling the spaces between the first and second wall plate members and the adjacent sides of the casting bed. The concrete is allowed to cure, thereby forming a concrete wall structure having a substantially planar concrete first outer surface, a plurality of steel-reinforced concrete "ribs" extending internally of the structure, and a second outer surface defined by the frame structure and adjacent surface of the insulating layer. Concrete top beam and toe sections are provided extending above and below the frame structure at locations corresponding to the spaces between the first and second wall plate members and the adjacent sides of the casting bed. Thereafter, the concrete wall structure may be removed from the casting bed, such as by removing one or more sides of the casting bed and/or lifting the wall structure therefrom.

In methods and apparatus for forming precast wall structures of the type described above, significant problems may be encountered with regard to quality control of the finished precast wall structure. Specifically, while pouring the unfinished concrete into the casting bed described above, difficulty may be encountered in maintaining the desired spaced-apart configuration of the insulating foam blocks. As the unfinished concrete flows over and around the insulating foam blocks, such blocks may be prone to flex and/or shift laterally along the layer of insulating material, and may further be prone to shift vertically due to buoyancy of the blocks in the more dense unfinished concrete. Furthermore, depending upon the flexural strength and stiffness of the layer of insulating material, the layer of insulating material may be subject to flexural deformation and/or failure under the weight of the unfinished concrete. The end result may be a finished wall structure which does not strictly conform to desired specifications.

In light of the above, an improved method for manufacturing a precast concrete wall structure, and a precast concrete wall structure manufactured to conform to more strict tolerances, is desired.

BRIEF SUMMARY OF THE INVENTIVE CONCEPT

The present general inventive concept, in various example embodiments, provides a precast concrete wall and a method for forming a wall structure. In one embodiment a frame is positioned within a casting bed having a plurality of upright surfaces defining a generally rectangular interior area. The frame comprises first and second spaced apart members extending along a width dimension of the frame and a plurality of studs interconnecting the first and second spaced apart members, the studs extending along a length dimension of the frame. A forming member is positioned in overlying relation above the frame. The forming member comprises a layer of insulating material defining a plurality of integrally-formed rectangular protrusions extending along a length dimension of the forming member in a parallel and spaced-apart relationship to one another to define a plurality of rectangular-shaped channels therebetween. Uncured concrete is placed within the casting bed and allowed to cover the forming member and substantially fill the channels. The concrete is then allowed to cure.

In various example embodiments according to several features of the present general inventive concept, the frame may comprise a plurality of metal studs. The forming member may be oriented in relation to the frame such that the length dimension of the forming member extends along the length dimension of the frame. The forming member may be sized to extend fully along length and width dimensions of the frame to limit the uncured concrete from flowing between the studs of the frame. The frame and forming member may be of a sufficient width to extend adjacent opposite first and second upright surfaces of the casting bed. The frame and forming member may be positioned within the casting bed to provide a first space between the frame first member and an associated third upright surface of the casting bed, wherein the uncured concrete is allowed to fill the first space to form a top beam portion of the wall structure. The frame and forming member may further be positioned within the casting bed to provide a second space between the frame second member and an associated fourth upright surfaces of the casting bed, wherein the uncured concrete is allowed to fill the second space to form a toe portion of the wall structure.

In various example embodiments, a spacer may be positioned between the frame first member and the third upright surface of the casting bed to form the first space. The spacer may be a strip of insulating material. The spacer and the forming member may each be fabricated from a material selected from the group consisting of expanded polystyrene, extruded polystyrene, and rock wool. The first and second upright surfaces of the casting bed may define structures shaped to allow the concrete to form matingly-shaped portions of a joint along opposite sides of the wall structure. For example, the first upright surface may define a ridge extending along a length thereof and the second upright surface may define a matingly-shaped groove extending along a length thereof.

In various example embodiments according to several features of the present general inventive concept, the forming member may be defined by a plurality of members arranged in side-by-side relationship. The plurality of forming member segments may be positioned in side-by-side relationship within the casting bed, each segment defining a portion of the total width of the forming member, including at least one rectangular protrusion and at least a portion of one channel. In certain embodiments, a plurality of reinforcing members may be positioned within the casting bed prior to placing the uncured concrete within the casting bed. For example, in certain embodiments, at least one reinforcing member may be placed along each channel. In certain embodiments, an upper surface of the concrete may be finished. For example, a desired texture may be stamped or otherwise formed into the upper surface of the concrete.

Various example embodiments of the present general inventive concept may provide a method of forming the panel to be used as a floor, wall, or roof structure including positioning one or more forming members within a casting bed having a plurality of upright surfaces defining a generally rectangular interior area, the one or more forming members comprising an insulating material extending along a length dimension of the one or more forming members to define a plurality of rectangular-shaped channels in a parallel and spaced-apart relationship, placing uncured concrete within the casting bed and allowing the concrete to cover the one or more forming members and substantially fill the channels, and allowing the concrete to cure.

Various example embodiments of the present general inventive concept may provide a panel to be used as a floor, wall, or roof structure, the panel including a concrete portion including a face portion and a plurality of joists extending inwardly from the face portion, and a plurality of insulating portions configured between each adjacent pair of the joists.

Additional aspects and advantages of the present general inventive concept will be set forth in part in the description which follows, and, in part, will be obvious from the description, or may be learned by practice of the present general inventive concept.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION OF THE INVENTION

Figure 1:
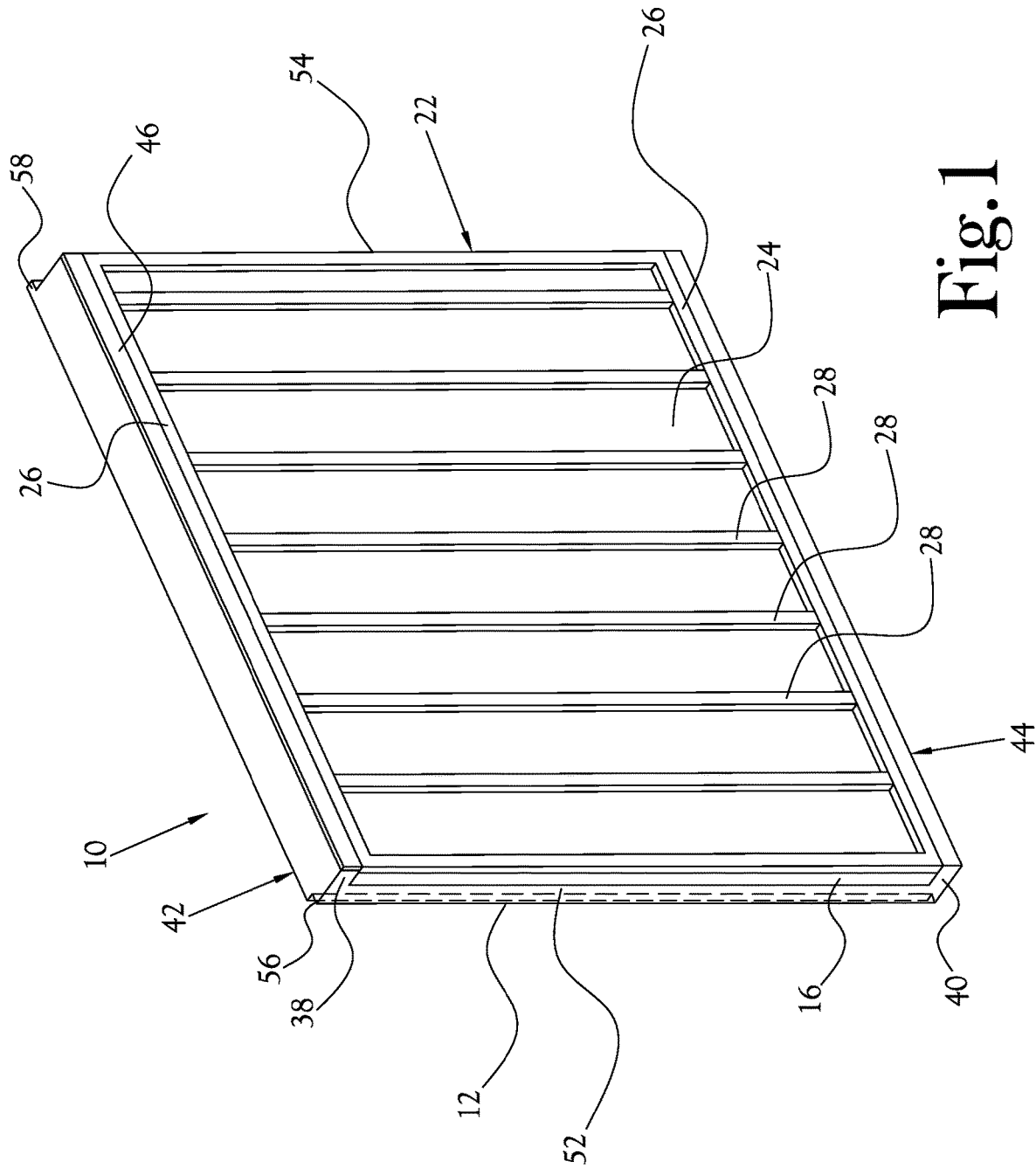
FIG. 1 is a perspective view showing one embodiment of a precast concrete wall constructed in accordance with several features of the present general inventive concept.

Reference will now be made to certain example embodiments of the present general inventive concept which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In accordance with several features of the present general inventive concept, a precast concrete wall structure and method for manufacturing a precast concrete wall structure are disclosed herein and in the accompanying figures. With reference to the accompanying figures, and with particular reference to FIGS. 1-3, in one embodiment, a wall structure 10 is provided which includes an outer concrete face 12 defining an outer surface 36 forming an exterior surface of the wall structure 10, and an inner surface 18 defining a plurality of inwardly-facing ribs 14. In the illustrated embodiment, each of the ribs 14 is of a substantially rectangular cross-section and extends substantially vertically along the inner surface 18 of the concrete face 12 in substantially parallel-planar, spaced apart relation to the other ribs. In the illustrated embodiment, the concrete face 12 defines elongated top beam 38 and toe 40 portions extending inwardly from the inner surface 18 along respective upper 42 and lower 44 ends of the concrete face 12, in an orientation substantially perpendicular to the ribs 14.

In several embodiments, the concrete face 12 is fabricated from a reinforced concrete material, of the type having a plurality of reinforcing members embedded in a cement-based concrete material. For example, in the present embodiment, a plurality of elongated steel reinforcing members are provided within the concrete face 12, extending substantially parallel to the inner and outer surfaces 18, 36 thereof. More specifically, in the present embodiment, a plurality of elongated steel members are provided, each member extending within and along a respective rib 14 of the concrete face 12, thereby strengthening the concrete face 12 and resisting flexure of the concrete face 12. In certain embodiments, additional reinforcement in the form of wire mesh or fiber materials may be provided within and along the concrete face 12.

It will be recognized that the above-discussed reinforcement against flexure of the concrete face 12 may be useful in various applications of the wall structure 10, such as for example use of the wall structure 10 in forming a basement or other below-ground or partially below-ground structure, or in forming a retaining wall structure. However, it will further be understood that the reinforcing members may be provided at other locations within the concrete face 12 without departing from the spirit and scope of the present general inventive concept. For example, in other embodiments, one or more reinforcing members may be provided slightly interior to the outer surface 36 of the concrete face 12 to reinforce the concrete face against flexure. Such reinforcement may be useful in other applications of the wall structure 10, such as for example use of the wall structure 10 in forming portion of an above-ground or partially above-ground structure, such as an above-ground or partially above-ground residential, commercial, or industrial building. Additional reinforcement may also be provided extending within the top beam 38 or toe 40 to provide strength and reinforcement to those portions of the wall structure 10.

A substantially planar forming member 16 is provided extending along the inner surface 18 of the concrete face 12. The forming member 16 defines a plurality of outwardly-extending rectangular protrusions 20 sized and shaped to be received in mating engagement between each of the ribs 14. In several embodiments, the forming member 16 is constructed from a material that allows the forming member 16 to provide moisture resistance and vapor permeability to the wall structure 10 and/or to decrease the overall thermal conductivity of the wall structure 10. For example, in several embodiments, the forming member 16 is fabricated from an insulating material, such as for example expanded polystyrene (EPS), extruded polystyrene (XPS), rockwool, or other such material. In a preferred embodiment, the forming member 16 is both resistant to moisture and thermally insulating.

Figure 2:
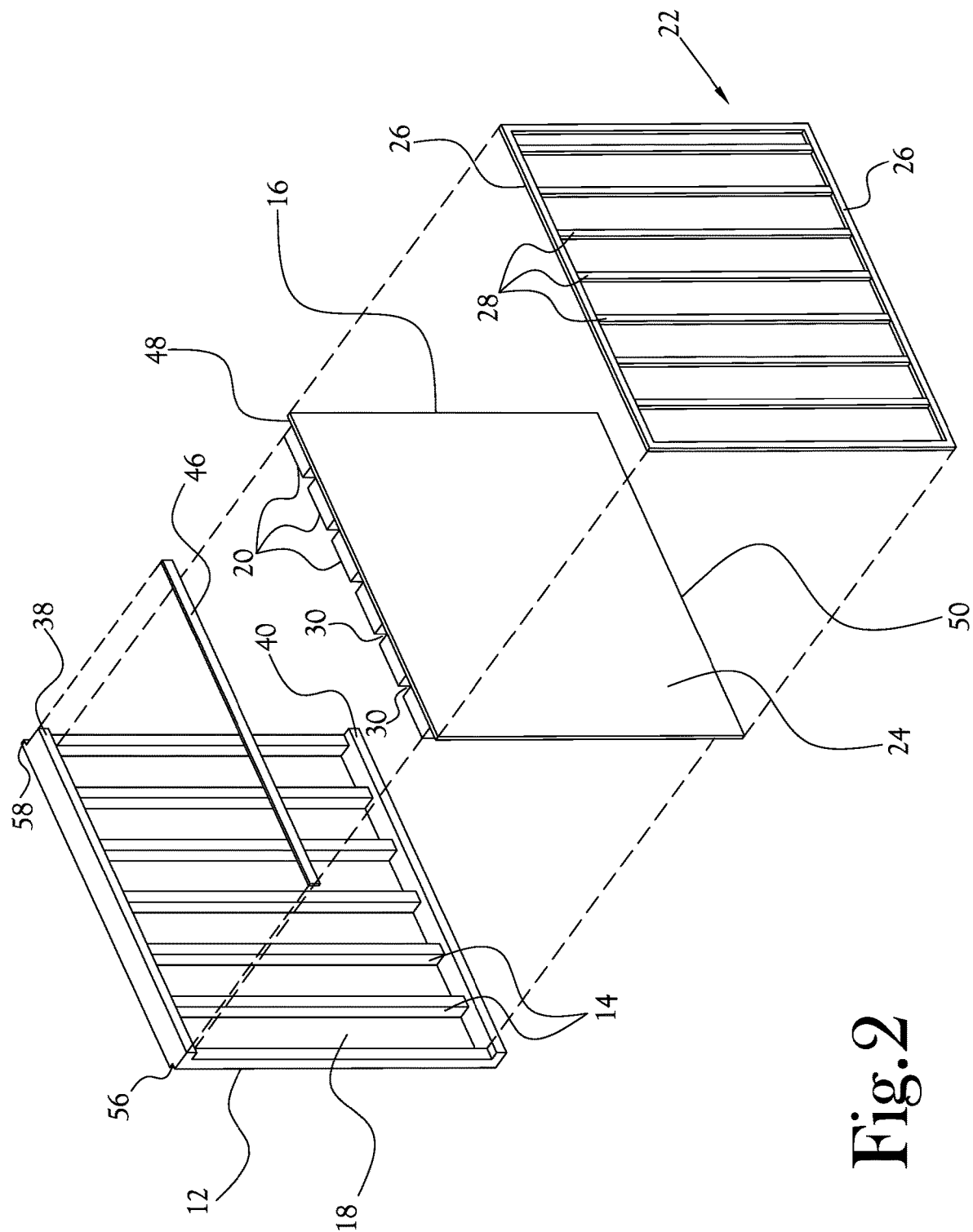
FIG. 2 is an exploded view of the precast concrete wall of FIG. 1.
Figure 3:
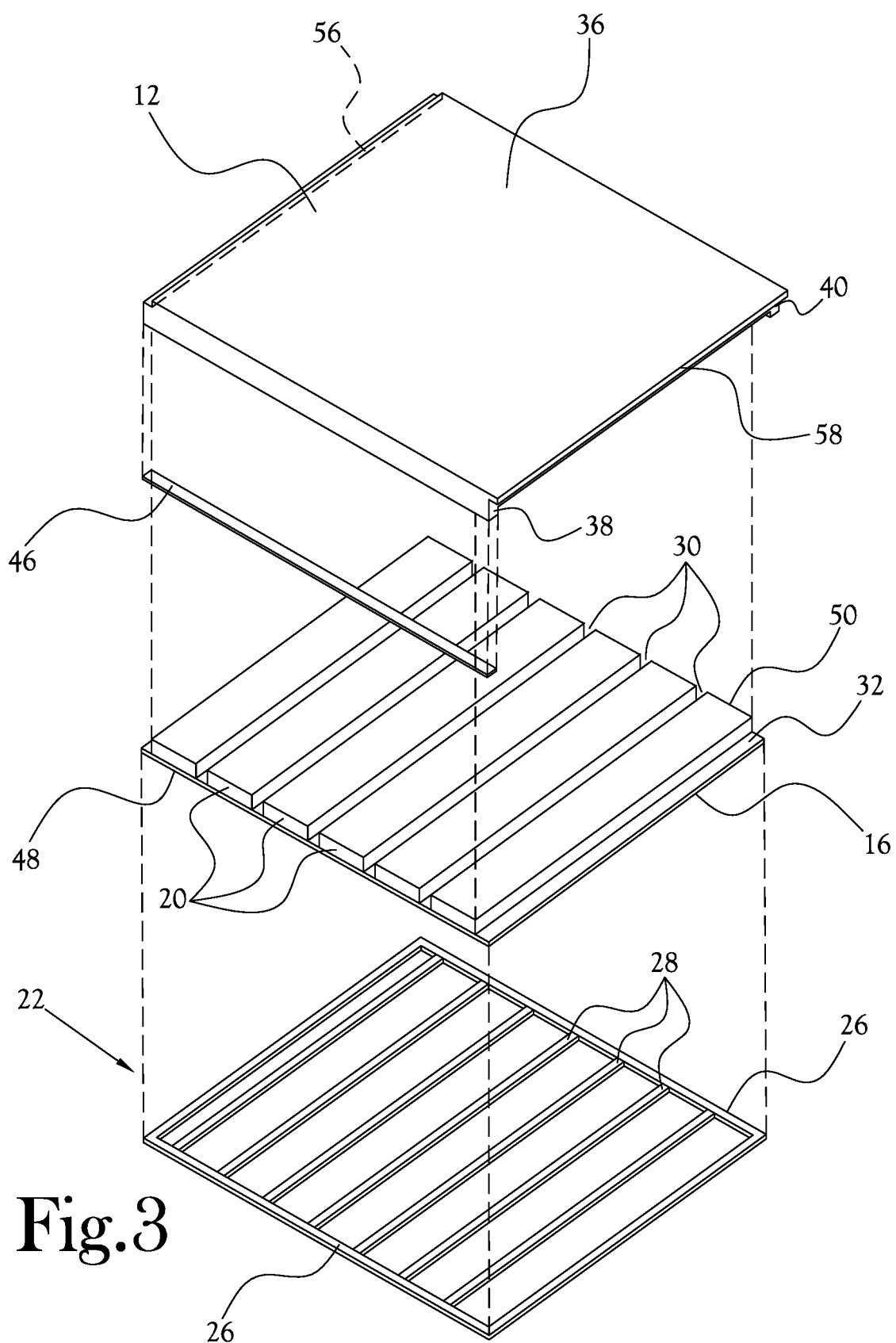
FIG. 3 is another exploded view of the precast concrete wall of FIG. 1.

Referring to FIGS. 2 and 3, in one embodiment, the forming member 16 comprises a layer of EPS material having a plurality of integrally-formed protrusions 20 extending along an outer surface 32 thereof. The protrusions 20 are generally rectangular in shape and extend in a parallel and spaced-apart relationship to one another to define a plurality of rectangular-shaped channels 30 therebetween. As will be discussed in greater detail below, the channels 30 provide mold forms for forming the ribs 14 of the concrete face 12 during manufacture of the wall structure 10. Hence, each rib 14 of the concrete face 12 is mated to, and is received within, a respective channel 30 of the forming member 16, and each protrusion 20 is received between and adjacent corresponding ribs 14 of the concrete face 12. It will be understood that the specific dimensions of the various elements of the forming member 16 may vary depending upon the desired characteristics of the finished wall structure 10. For example, in one embodiment, the rectangular protrusions 20 may be approximately sixteen inches wide, while the channels 30 may be approximately 3.5 inches wide and approximately 5.5 inches deep. Accordingly, each mating rib 14 may be approximately 3.5 inches wide and approximately 5.5 inches deep, and each rib 14 may be spaced approximately 19.5 inches apart, centerline-to-centerline. In this embodiment, the portions of the forming member 16 extending between the rectangular protrusions 20 may be approximately 1.5 inches thick. However, it will be understood that the present general inventive concept is not limited to such dimensional restrictions.

In several embodiments, the forming member 16 terminates at a lower edge of the top beam 38 and at an upper edge of the toe 40. In certain of these embodiments, the top beam 38 and toe 40 each extend inwardly to at least partially surround upper and lower ends, respectively, of the forming member 16. In some embodiments, the top beam 38 and toe 40 portions of the concrete face 12 may each extend inwardly to completely surround the upper and lower ends, respectively, of the forming member 16. In other words, the top beam 38 and toe 40 portions of the concrete face 12 may each extend inwardly to terminate substantially flush with an inner surface 24 of the forming member 16. In other embodiments, the top beam 38 and toe 40 portions of the concrete face 12 may terminate outwardly of the forming member inner surface 24, or in other words, may terminate short of the inner surface 24 of the forming member 16. In certain of these embodiments, at least one insulating member 46 may be provided along an inner surface of the top beam 38 and/or the toe 40.

In several embodiments, the forming member 16 defines a relatively smooth inner surface 24 opposite the outwardly-extending protrusions 20. The inner surface 24 of the forming member 16 defines an interior surface of the wall structure 10. In several embodiments, a stud frame 22 is secured along the inner surface 24 of the forming member 16 to provide an attachment means for additional structures which may be useful in conjunction with the wall structure 10, i.e., drywall or other interior wall sheathing, additional insulation, plumbing or electrical fixtures, or the like. In the illustrated embodiment, the stud frame 22 comprises generally first and second spaced apart members 26 extending along opposite upper and lower edges 48, 50 of the forming member 16. The upper and lower members 26 are interconnected by a plurality of studs 28 extending perpendicular to the members 26 in parallel, spaced apart relation to one another. The stud frame 22 may be fabricated from any of a variety of conventional materials commonly used in the construction of building framing without departing from the spirit and scope of the present general inventive concept. However, in a preferred embodiment, the stud frame 22 is of a metal construction and comprises generally first and second spaced apart metal tracks 26 having metal studs 28 extending therebetween.

In the illustrated embodiment, the various studs 28 of the stud frame 22 extend uniformly between the upper and lower members 26 at evenly-spaced locations along the width of the stud frame 22. However, it will be recognized that the configuration of the stud frame 22 may vary in order to allow the stud frame 22 to provide any of numerous desirable features commonly associated with framed building construction. For example, in several embodiments, the upper and lower members 26 of the stud frame 22 may comprise double cap or sole members of the type commonly found in traditional building framing. The stud frame 22 may further define door or window frames, with associated cripple studs, top beam members, etc., of the type commonly found in building framing. It will be recognized that, in such embodiments, corresponding through openings may be defined in the concrete face 12 and forming member 16 to accommodate such door and window frames. Numerous such configurations will be recognized by one of skill in the art and may be used without departing from the spirit and scope of the present general inventive concept.

In several embodiments, opposite first and second sides 52, 54 of the wall structure 10 define suitable structures or mating surfaces to allow the wall structure 10 to be joined along its first or second side 52, 54 with an adjacent wall structure 10 to form a continuous wall. For example, in several embodiments, suitable fasteners are embedded along the first or second sides 52, 54 of the wall. In other embodiments, the first and second sides 52, 54 of the wall structure 10 define mating joint surfaces adapted to form a joint with an adjacent wall structure 10. With reference to FIGS. 1-3, in the illustrated embodiment, the first and second sides 52, 54 of the wall structure define matingly-shaped female and male lap joints, respectively, extending along respective lengths of the first and second sides 52, 54. More specifically, in the illustrated embodiment, the portion of the concrete face 12 along the first side 52 defines a female portion of a lap joint 56, while the portion of the concrete face 12 along the second side 54 defines a male portion of a lap joint 58. The female and male lap joint portions 56, 58 are matingly-shaped, such that each male portion 56 may mate with a corresponding female portion 58 of an adjacent wall structure 10, thereby joining adjacent wall structures in side-by-side relationship with one another. Those of skill in the art will recognize other suitable shapes which may be used in forming the mating surfaces of the first and second sides 52, 54 of the wall structure without departing from the spirit and scope of the present general inventive concept.

Figure 4:
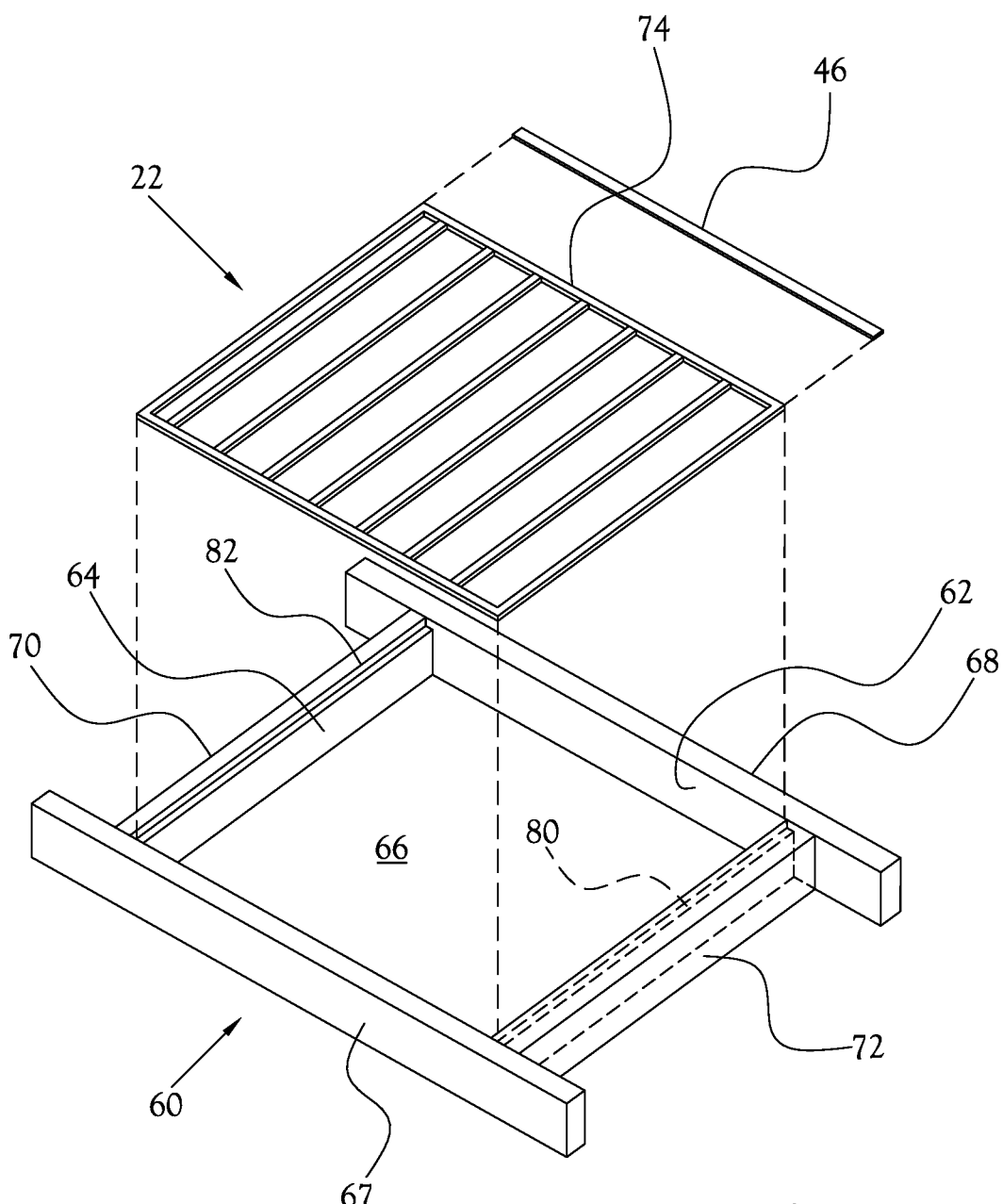
FIG. 4 is a partially exploded perspective view showing various operations of one embodiment of a method according to several features of the present general inventive concept.
Figure 5:
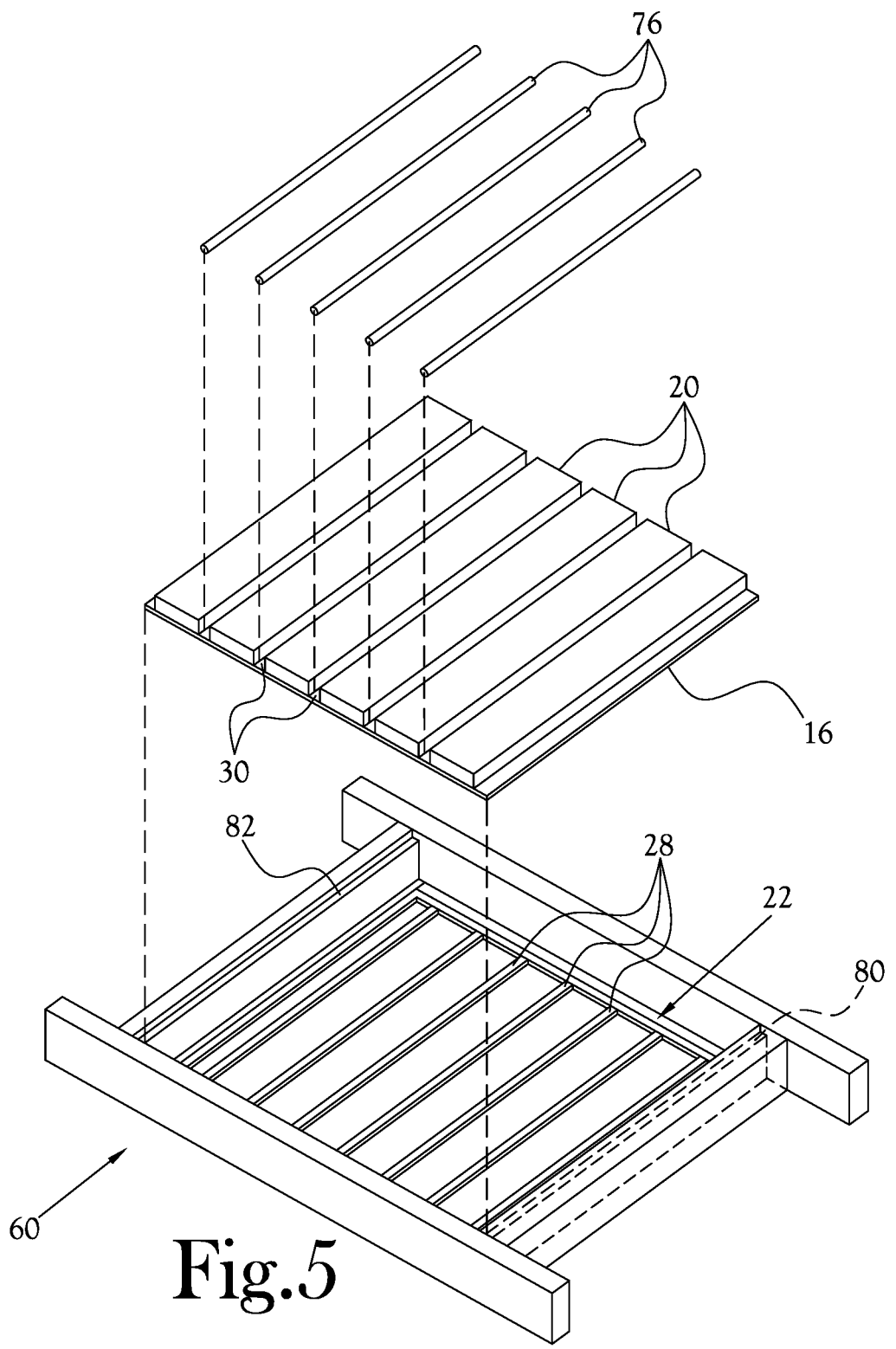
FIG. 5 is a partially exploded perspective view showing other operations of the method of FIG. 4.
Figure 6:
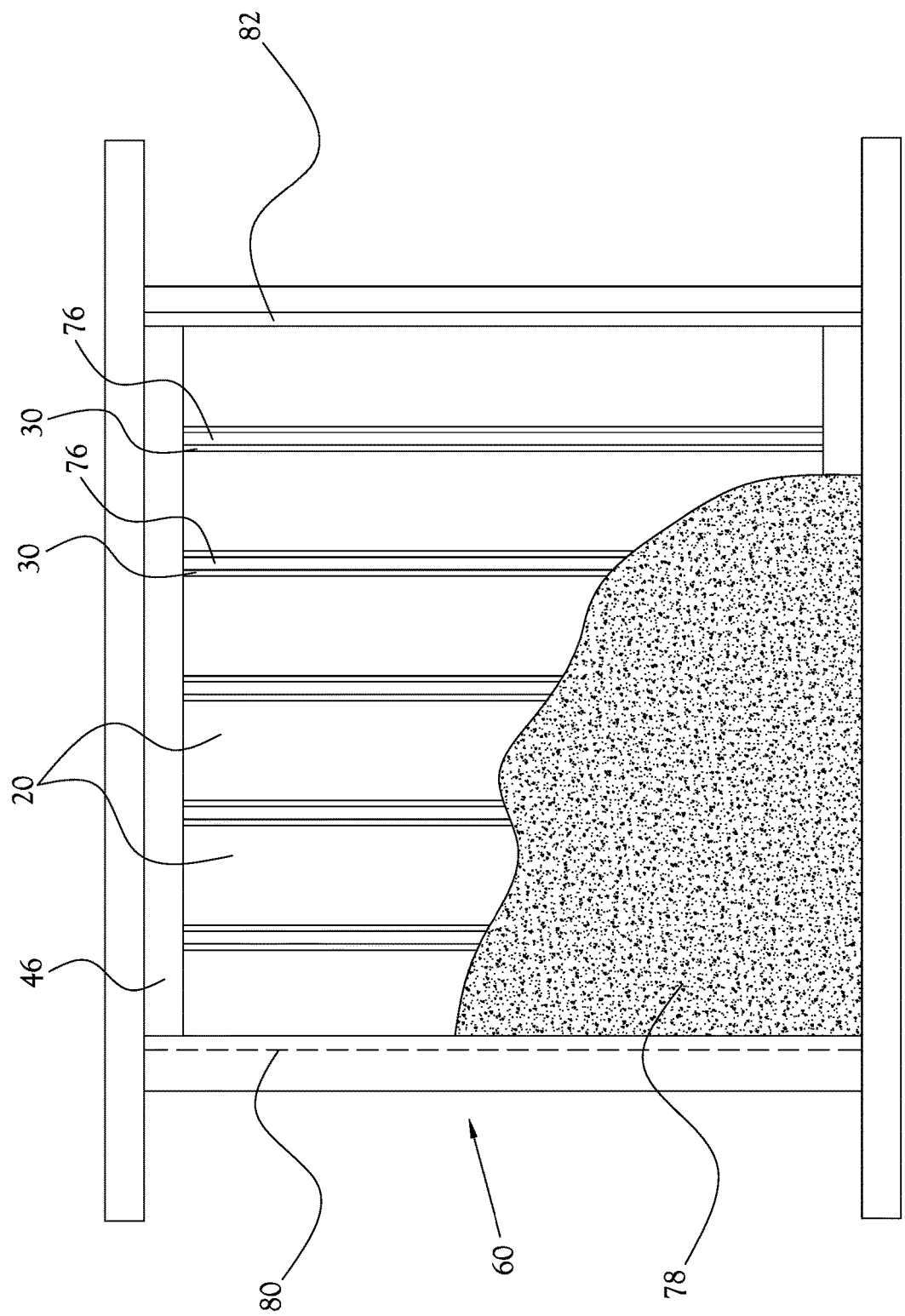
FIG. 6 is a top view showing other operations of the method of FIG. 4.

In accordance with several additional features of the present general inventive concept, a method of manufacturing a precast concrete wall structure is also disclosed herein and in the accompanying figures. Various operations according to one embodiment of a method of manufacturing a precast concrete wall structure, or "method," may be understood by reference to the illustrations depicted in FIGS. 4-6 and the description herein. With reference to FIGS. 4-6, in one embodiment, a casting bed 60 is provided having a plurality of surfaces 62, 64 for defining a generally rectangular interior area 66 corresponding generally to a desired overall shape of the finished wall structure 10. In the embodiment of FIG. 4, the casting bed 60 includes generally first and second elongated side rails 67, 68 arranged in a parallel, spaced-apart relationship, with first and second elongated gate members 70, 72 extending therebetween in parallel, spaced-apart relationship with one another, and in perpendicular relationship with the first and second side rails 67, 68. Each side rail 67, 68 defines an interior planar surface 62 facing an interior planar surface 62 of the opposite side rail 67, 68, and likewise, each gate member 70, 72 defines an interior planar surface 64 facing an interior planar surface 64 of the opposite gate member. Thus, the planar surfaces 62, 64 cooperate to define a substantially rectangular interior area 66 therebetween. The various side rails 67, 68 and gate members 70, 72 may be assembled and placed along a substantially flat, level support surface, such as a table or the floor, with respective lower edges of the interior planar surfaces 62, 64 substantially flush with the support surface, thereby substantially closing the lower end of the rectangular interior area 66. Thus, the interior area 66 forms a substantially planar, rectangular mold having an interior shape substantially corresponding to a desired overall shape of the finished wall structure 10.

In several embodiments, one or more of the interior planar surfaces 62, 64 of the casting bed may optionally define shapes suitable for forming the above-discussed fasteners and/or joint portions of the wall structure 10. For example, in one embodiment, the interior surface 64 of the second gate member 72 defines a lip 80 extending outwardly therefrom along a length thereof, while the interior surface 64 of the opposite first gate member 70 defines a groove 82 extending along a length thereof. The lip and groove 80, 82 provide mold surfaces of the casting bed 60 suitable to form the above-discussed matingly-shaped joint portions 56, 58 along opposite side surfaces of the finished wall structure 10. In other embodiments, suitable cutouts are provided along interior surfaces 62, 64 to allow the placement of fasteners along the interior surfaces, protruding into the interior area 66 of the casting bed 60.

With reference to FIG. 4, a stud frame 22 may be provided and positioned within the casting bed 60 to extend along the support surface. In several embodiments, the casting bed 60 is sized such that the frame 22 extends substantially fully between opposite interior surfaces 64 of the of the gate members 70, 72 and/or between opposite interior surfaces 62 of the side rails 67, 68. In other embodiments, the frame 22 may be sized to extend only partially between opposite interior surfaces 62 of the of the side rails 67, 68 and/or between opposite interior surfaces 64 of the gate members 70, 72. In such embodiments, the frame 22 may be positioned between the opposite interior surfaces 62, 64 of the side rails 67, 68 and gate members 70, 72 so as to provide space between the frame 22 and the interior surfaces 62, 64 for formation of the top beam 38 and toe 40 portions of the wall structure 10 discussed above. In some embodiments, a suitable spacer may optionally be positioned between the frame 22 and at least one interior surface 62, 64 of the casting bed 60 to assist in positioning the frame 22 at a desired location along the support surface of the casting bed 60. In some embodiments, the spacer may be designed to form a portion of the top beam 38 or toe 40 of the wall structure 10 upon completion of the wall structure 10 as described hereinbelow. For example, in the illustrated embodiment, the above-discussed insulating member 46 serves as an elongated spacer during manufacture of the wall structure 10. The insulating member (hereinafter, "spacer") 46 comprises a strip of insulating extruded polystyrene (XPS) approximately one inch in thickness. The spacer 46 is positioned between the upper member 74 of the stud frame 22 and an adjacent interior surface 62 of the casting bed 60. Upon completion of the present embodiment of the method as further described hereinbelow, the spacer 46 forms an interior portion of the top beam 38 of the wall structure 10 and provides a layer of insulation and moisture resistance to the top beam portion 38 of the wall structure 10.

With reference to FIG. 5, upon positioning the frame 22 within the casting bed 60, a forming member 16 may then be positioned in overlying relationship above the stud frame 22, with the rectangular protrusions 20 of the forming member 16 protruding generally upwardly away from the frame 22. In several embodiments, the forming member 16 may be sized to extend along the frame 22 to span the length and width of the frame 22, thereby cooperating with the support surface of the casting bed to encapsulate the spaces between each of the studs 28 of the frame 22 and to limit fluid communication between the spaces between the studs 28 and the remainder of the interior area 66 of the casting bed 60. In a preferred embodiment, the forming member 16 is positioned such that the protrusions 20 extend generally parallel to the studs 28 of the frame 22. However, it will be recognized that the protrusions 20 may be positioned non-parallel to the studs 28 without departing from the spirit and scope of the present general inventive concept.

As discussed above, the forming member 16 includes a plurality of rectangular protrusions 20 extending in parallel and spaced-apart relationship to define a plurality of parallel channels 30 extending along a width dimension of the forming member 16. In one embodiment, the forming member 16 is defined by a single, unitary member. In other embodiments, the forming member 16 is defined by a plurality of members arranged in side-by-side relationship to form the forming member 16. For example, in one embodiment, a plurality of forming member segments are provided, with each segment defining a portion of the total length of the forming member 16, including one or more of the rectangular protrusions 20 and one or more channels 30. In this embodiment, a plurality of forming member segments are provided and arranged in side-by-side relationship to form the complete forming member 16, including the desired number of rectangular protrusions 20 and channels 30 interposed therebetween. The forming member segments may be secured to one another via suitable fasteners of the type known to one of skill in the art.

With further reference to FIG. 5, following placement of the forming member 16 in the casting bed 60, a plurality of reinforcing members 76 are optionally positioned within the casting bed 60 at locations either above the forming member 16 or between the protrusions 20, within the channels 30. As discussed above, the reinforcing members 76 may be of the type commonly used to reinforce concrete, such as for example rebar segments, wire mesh, or the like. The reinforcing members 76 may be supported centrally along each of the channels 30 or may be supported from contact with the surfaces of the forming member 16 using suitable spacers of the type known to one of skill in the art.

As shown in FIG. 6, following placement of the forming member 16 and optional placement of the reinforcing members 76, uncured, flowable concrete 78 is placed within the casting bed 60. The concrete 78 is allowed to fill each of the channels 30 and any voids between the side walls 62, 64 of the casting bed 60 and the frame 22 and forming member 16. For example, as discussed above, in one embodiment, suitable spaces are left between each of the upper and lower members 26 of the frame 22 and the adjacent walls 62, 64 of the casting bed 60 for formation of the top beam 38 and toe 40 portions of the wall structure 10 along outer edges of the wall structure adjacent the upper and lower members 26 of the frame 22. In such embodiments, the flowable concrete 78 is allowed to fill such spaces, thereby forming the top beam 38 and toe 40 portions of the wall structure 10. However, it will be recognized that, because the forming member 16 serves to encapsulate the spaces between each of the studs 28 of the frame 22, the forming member 16 limits the concrete from flowing into the spaces between each of the studs 28.

In certain embodiments, an upper surface of the uncured concrete 78 is finished to a substantially level surface. In other embodiments, self-leveling concrete is employed, such that finishing the upper surface subsequent to pouring the concrete 78 into the casting bed 60 is not necessary. In still other embodiments, and in particular in certain embodiments in which the outer surface of the concrete face 12 is to be exposed, such as for example when the wall structure 10 is to be used in an above-ground or partially above-ground setting, the uncured concrete 78 may be finished to a desired texture via tamping, troweling, brushing, stamping, or other techniques known in the art. Thereafter, the concrete is allowed to at least partially cure to form a rigid concrete face 12, thereby forming the finished wall structure 10. The wall structure 10 may then be removed from the casting bed 60 by means known in the art, such as for example by lifting the wall structure 10 and/or by disassembling, or partially disassembling, the casting bed 60. In still other embodiments, following curing of the concrete to form the rigid concrete face 12, the exterior surface of the concrete face 12 is further finished to a desired surface or texture. For example, in one embodiment, following curing of the concrete, an additional application of material, such as for example paint, stain, wood or brick veneer, plaster, or the like, is applied to the outer surface of the concrete face 12. In another embodiment, following curing of the concrete, the outer surface of the concrete face 12 is abraded, such as for example by sanding, sandblasting, or the like, to a desired finish.

Figure 7:
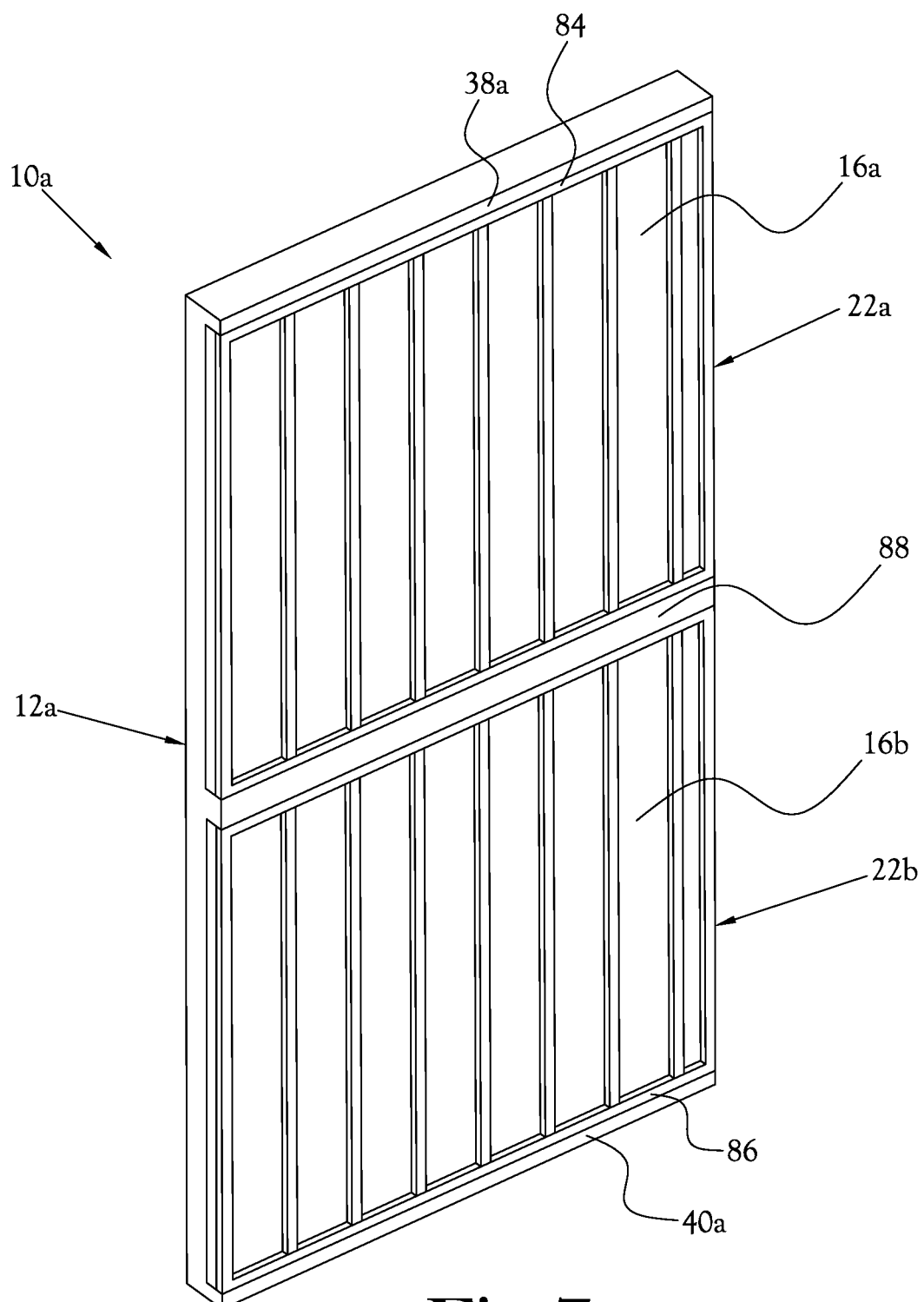
FIG. 7 is a perspective view of another embodiment of a precast concrete wall constructed in accordance with several features of the present general inventive concept.

FIGS. 7-10 illustrate another embodiment of a wall structure 10a, as well as various operations of another embodiment of a method according to several features of the present general inventive concept. In the embodiment of FIGS. 7-10, a wall structure 10a is formed which may be used in the construction of a wall which extends upwards to provide multiple floors in height. With reference to FIG. 7, in one embodiment, the wall structure 10a includes generally a first stud frame 22a and corresponding forming member 16a arranged in parallel-planar, overlying relationship with one another, and a second stud frame 22b and corresponding forming member 16b arranged in parallel-planar, overlying relationship with one another. The first stud frame 22a and corresponding forming member 16a are arranged in a spaced-apart, end-to-end configuration in relation to the second stud frame 22b and corresponding forming member 16b. Thus, the outer concrete face 12a extends around an upper end 84 of the first stud frame 22a and corresponding forming member 16a to form a top beam 38a, around a lower end 86 of the second stud frame 22b and corresponding forming member 16b to form a toe 40a, and between the two sets of stud frames and forming members to form an intermediary beam 88.

In the illustrated embodiment, the first and second sets of stud frames and forming members 16a, 22a and 16b, 22b are arranged in an end-to-end vertical configuration, such that the wall structure 10a may provide multiple floors in height. In such an embodiment, it will be recognized that the intermediary beam 88 may serve to provide a location for anchoring additional structures suitable to form an elevated ceiling, floor structure, or the like. However, it will further be understood that other configurations for the first and second sets of stud frames and forming members 16a, 22a and 16b, 22b may be utilized without departing from the spirit and scope of the present general inventive concept. For example, in another embodiment (not shown), the first and second sets of stud frames and forming members are arranged in a horizontal, side-by-side configuration, such that the concrete face forms a top beam along upper ends of both sets of stud frames and forming members, a toe along lower ends of both sets of stud frames and forming members, and a vertical stud extending between the two sets of stud frames and forming members. It will further be recognized that multiple sets of stud frames and forming members may be provided in side-by-side arrangement, end-to-end arrangement, or a combination thereof, without departing from the spirit and scope of the present general inventive concept.

Figure 8:
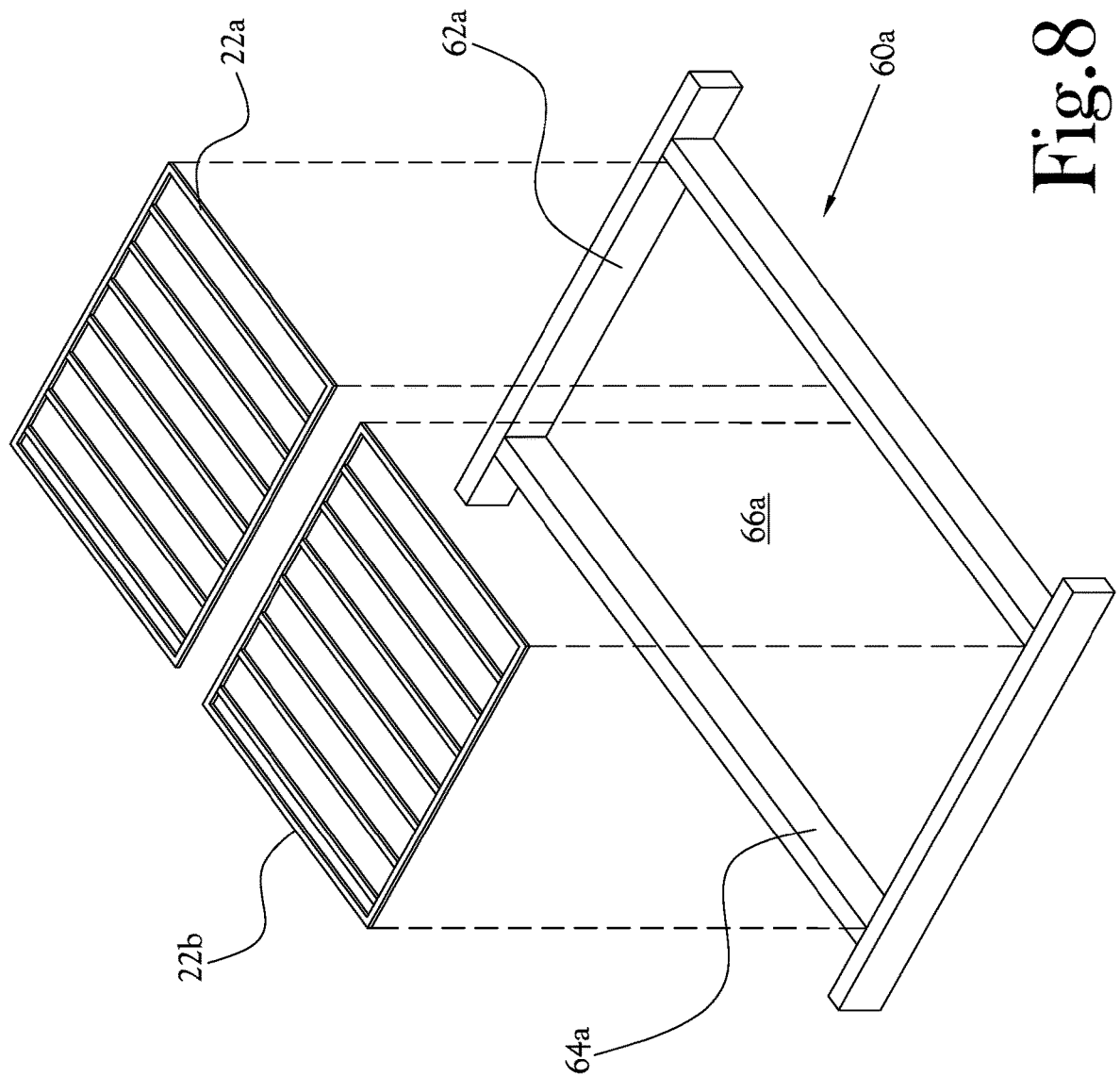
FIG. 8 is a partially exploded perspective view showing various operations of another embodiment of a method according to several features of the present general inventive concept.
Figure 9:
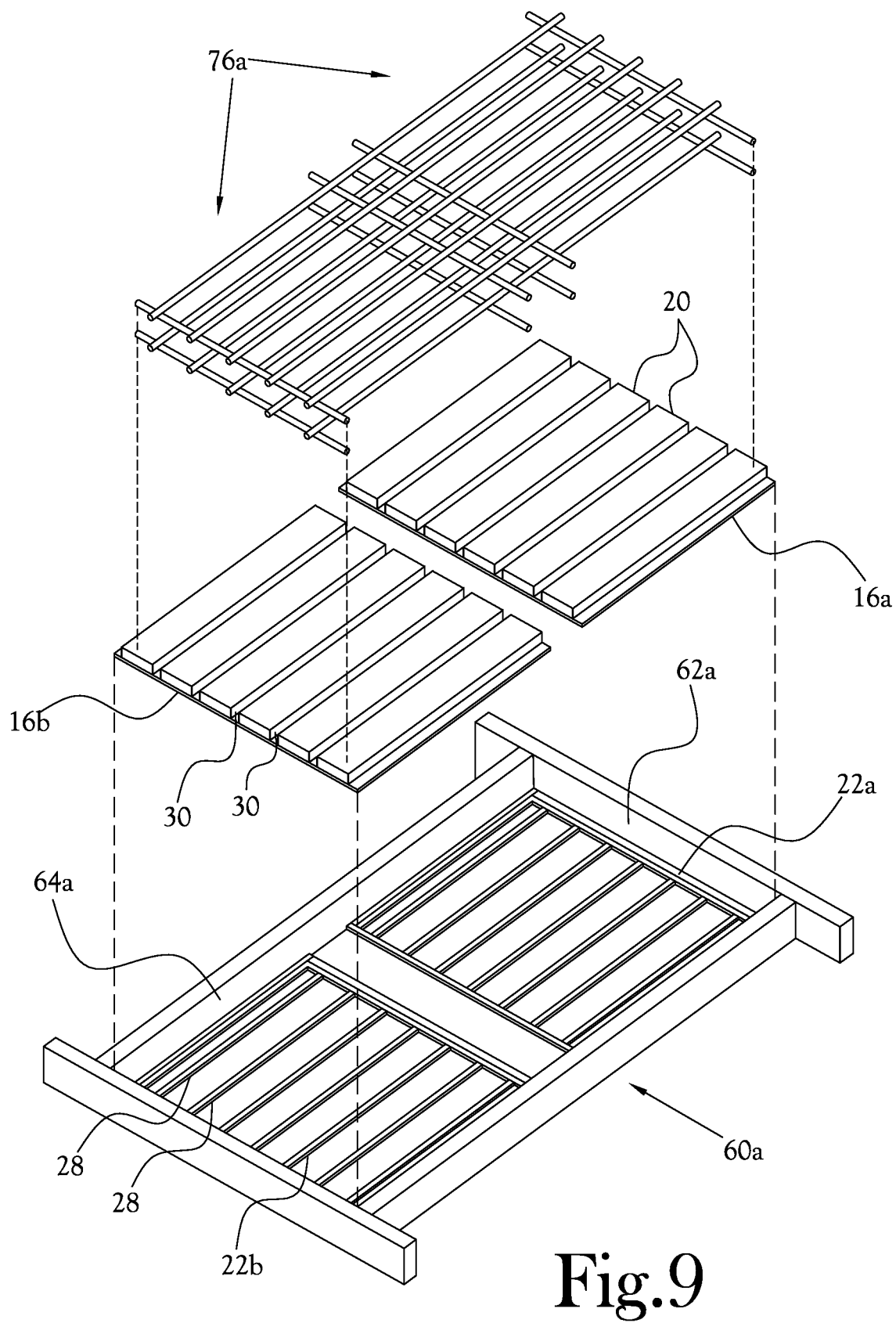
FIG. 9 is a partially exploded perspective view showing other operations of the method of FIG. 8.
Figure 10:
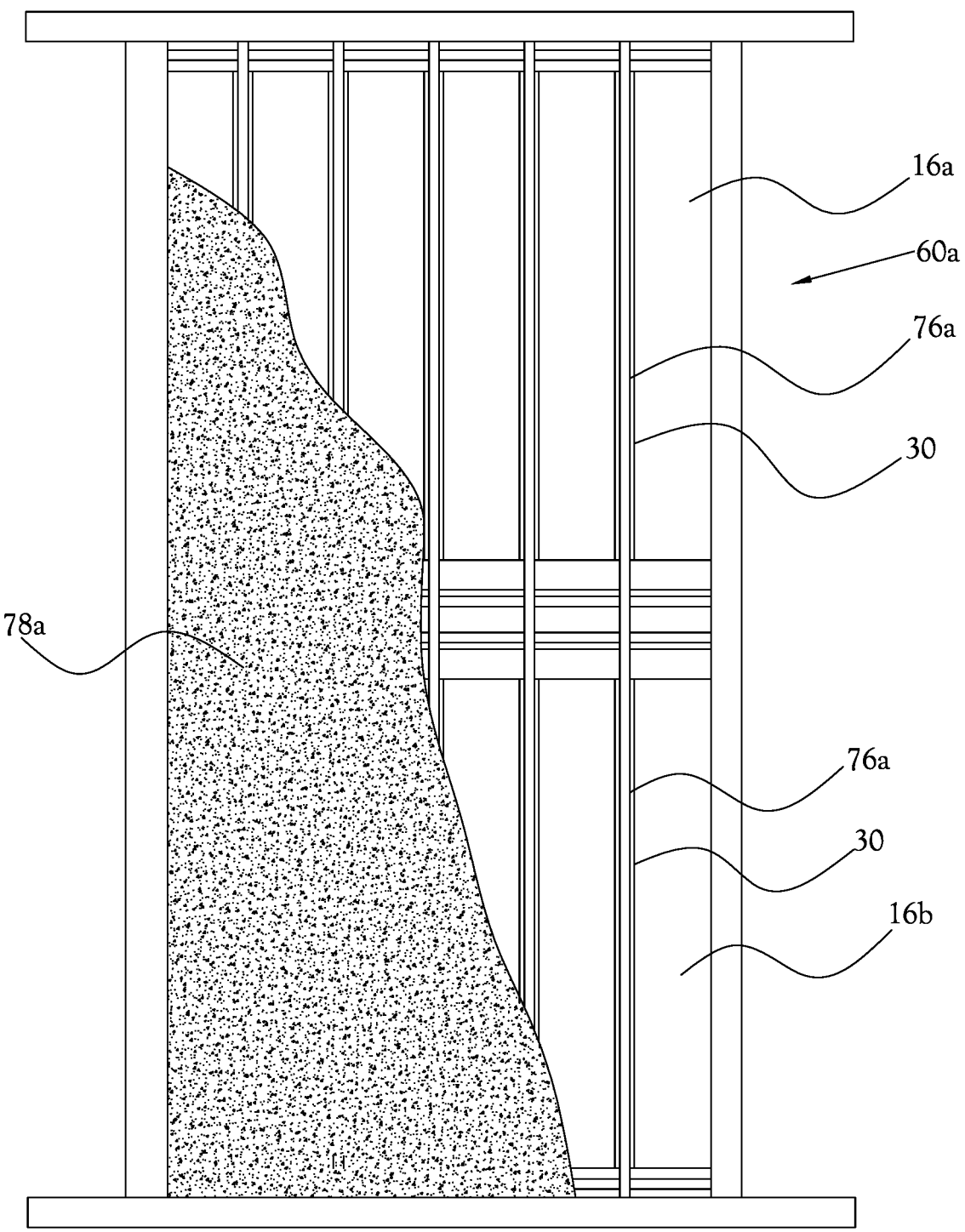
FIG. 10 is a top view showing other operations of the method of FIG. 8.

With reference to FIGS. 8-10, in one embodiment of the method, a casting bed 60a is provided having a plurality of surfaces 62a, 64a for defining a generally rectangular interior area 66a corresponding generally to a desired overall shape of the finished wall structure 10a. Of note in the present illustrated embodiment, the depicted casting bed 60a does not include the above-discussed structures suitable for formation of the joint. Thus, each of the interior surfaces 62a, 64a of the casting bed 60a is relatively smooth and upright.

As shown in FIG. 8, in one embodiment of the method, the above-discussed first and second stud frames 22a, 22b may be provided and positioned within the casting bed 60a in a parallel-planar relationship along the support surface, and in an end-to-end, or side-by-side, and spaced-apart relationship with one another. In the illustrated embodiment, the casting bed 60a is sized such that the first and second frames 22a, 22b each extend substantially fully between opposite interior side surfaces 64a of the of casting bed 60a. However, the distance between opposite interior end surfaces 62a of the casting bed 60a is such that the frames 22a, 22b extend between the end surfaces 62a in their end-to-end and spaced-apart configuration and allow sufficient space from the end surfaces 62a to form the above-discussed top beam 38a and toe 40a. It will be noted that, in the illustrated embodiment, the above-discussed spacer between the frames and the interior surfaces of the casting bed is not provided. However, one or more such spacers similar to the one described above may be provided without departing from the spirit and scope of the present general inventive concept.

With reference to FIG. 9, upon positioning the first frame 22a within the casting bed 60a, the first forming member 16a may then be positioned in overlying relationship above the first frame 22a, with the rectangular protrusions 20 of the first forming member 16a protruding generally upwardly away from the first frame 22a. Likewise, upon positioning the second frame 22b within the casting bed 60a, the second forming member 16b may then be positioned in overlying relationship above the second frame 22b, with the rectangular protrusions 20 of the second forming member 16b protruding generally upwardly away from the second frame 22b. Similar to the above-discussed embodiment, the forming members 16a, 16b may be sized to extend along their respective frames 22a, 22b to span the length and width of the frame, thereby cooperating with the support surface of the casting bed 60a to encapsulate the spaces between each of the studs 28 of the respective frame 22a, 22b and to limit fluid communication between the spaces between the studs 28 and the remainder of the interior area 66a of the casting bed 60a. Furthermore, as discussed above, each of the forming members 16a, 16b may be defined by a single, unitary member, or may be defined by a plurality of members arranged in side-by-side relationship to form the forming member.

With further reference to FIG. 9, following placement of the forming members 16a, 16b in the casting bed 60a, a plurality of reinforcing members 76a are optionally positioned within the casting bed 60a at locations either along or between the forming members 16a, 16b. In the illustrated embodiment, the reinforcing members 76a are distributed generally along the various channels 30 of the forming members 16a, 16b, along the space between the two forming members 16a, 16b and between the two frames 22a, 22b, and along the spaces between each of the forming members 16a, 16b and their respective adjacent interior end surfaces 62a of the casting bed 60a. As shown in FIG. 10, following placement of the reinforcing members 76a, uncured, flowable concrete 78a is placed within the casting bed 60a. The concrete 78a is allowed to fill each of the channels 30 of the forming members 16a, 16b, the space between the two forming members 16a, 16b and between the two frames 22a, 22b, and any voids between the side walls 62a, 64a of the casting bed 60a and the frames 22a, 22b and forming members 16a, 16b. Thus, the flowable concrete 78 is allowed to form the top beam 38a, toe 40a, and intermediate beam 88 portions of the wall structure 10.

Similar to the above-discussed method, in certain embodiments, an upper surface of the uncured concrete 78a is finished to a desired surface. For example, in certain embodiments, the upper surface of the uncured concrete 78a is finished to a substantially level surface. In still other embodiments, the uncured concrete 78a is finished to a desired texture via techniques known in the art, such as for example painting, staining, tamping, troweling, brushing, stamping, or the application of veneers or other such surface coverings. The concrete is allowed to at least partially cure to form the rigid concrete face 12a, thereby forming the finished wall structure 10a. The wall structure 10a may then be removed from the casting bed 60a by means known in the art, such as for example by lifting the wall structure 10a and/or by disassembling, or partially disassembling, the casting bed 60a.

From the foregoing description, it will be recognized by one skilled in the art that a precast concrete wall structure and method for manufacturing a precast concrete wall structure are provided herein which allow significant improvement over prior art methods and apparatus. For example, it will be recognized that, by forming the forming layer 16 from an insulating material, such as for example expanded polystyrene (EPS), extruded polystyrene (XPS), rockwool, or other such material, the forming layer 16 serves to increase the insulating properties of the wall structure 10, thereby allowing the wall structure 10 to be used in applications in which an insulating wall is desired absent the need to add further insulating material to the wall structure 10. It will further be recognized that the amount of thermal resistance provided by the materials of the forming layer 16 are, at least in part, a function of the average thickness per unit area of forming layer material along the surface of the wall structure 10. Accordingly, it will be recognized that the specific dimensions of the forming layer 16, i.e., the thickness, width, and spacing of the protrusions 20 and of the portions of the forming layer 16 between the protrusions 20, may vary in order to achieve a desired thermal resistance of the wall structure 10, while also maintaining structural integrity of the wall structure 10 and suitability of the wall structure 10 for use in a specific application.

It will be recognized that, through application of the method disclosed herein, a precast concrete wall structure may be made having significant advantages over conventional poured-in-place concrete wall structures. Through application of the method disclosed herein, a precast concrete wall structure weighing approximately 50 lbs. per square foot may be produced, wherein a poured-in-place concrete structure of the same thickness would weigh approximately 126 lbs. per square foot. Thus, significant reductions in material cost and associated transportation expense may be achieved. Furthermore, it will be recognized that the precast concrete wall structure provided herein includes a frame having studs pre-installed along one surface thereof, thereby saving the expense and labor associated with installing these fixtures at the desired finished location for the wall structure. In several embodiments, the EPS and XPS materials forming the wall structure may be recycled into other products following their use in the wall structure, and in certain embodiments, scrap EPS materials may be used to form the forming member. Furthermore, it will be understood that the reinforcing members may be formed from recycled materials, i.e., recycled rebar, without departing from the spirit and scope of the present general inventive concept.

Various example embodiments of the present general inventive concept may also be used to produce floor and/or roof structures such as floor panels, roof panels, deck panels, etc. FIGS. 11-18 illustrate various features and configurations of two example embodiments of such panels. For the sake of simplicity in these descriptions, the structures may be referred to simply as panels, but it is understood that the structures can be utilized as floor panels, deck panels, roof panels, etc., or any other number of similar structures, including wall panels.

Figure 11:
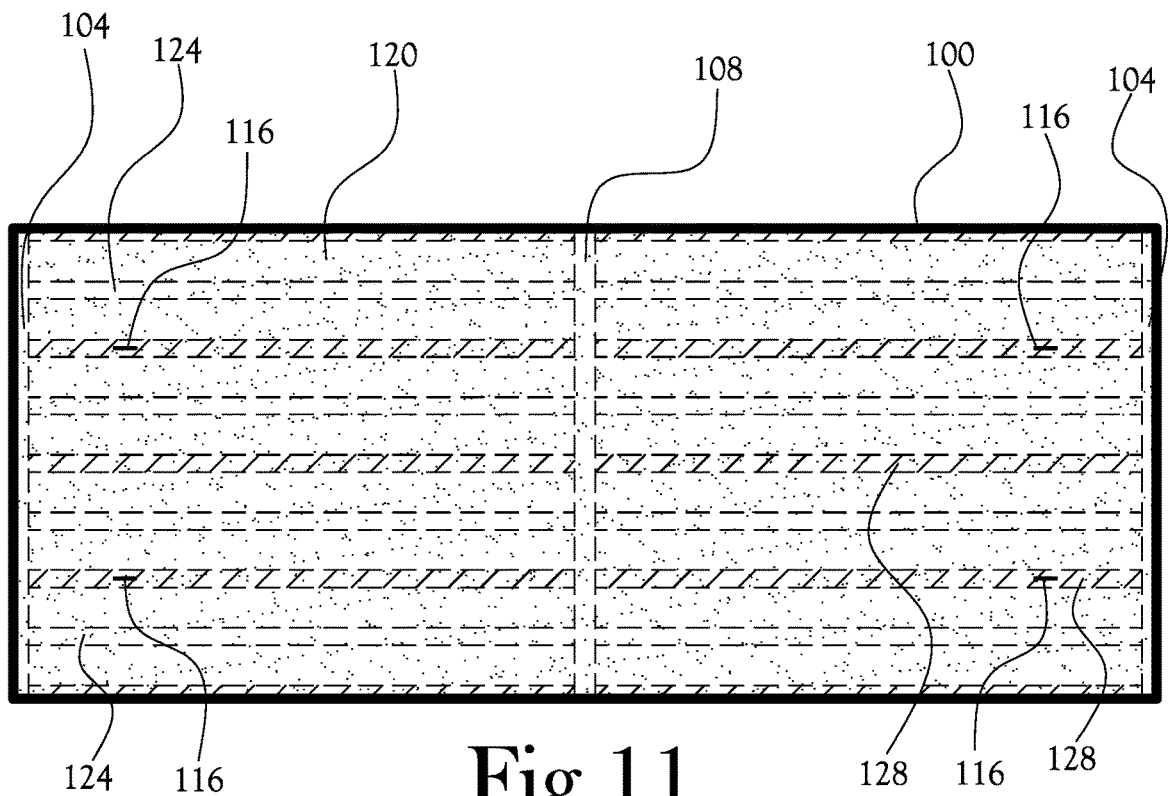
FIG. 11 illustrates a plan view of a panel according to an example embodiment of the present general inventive concept.
Figure 12:
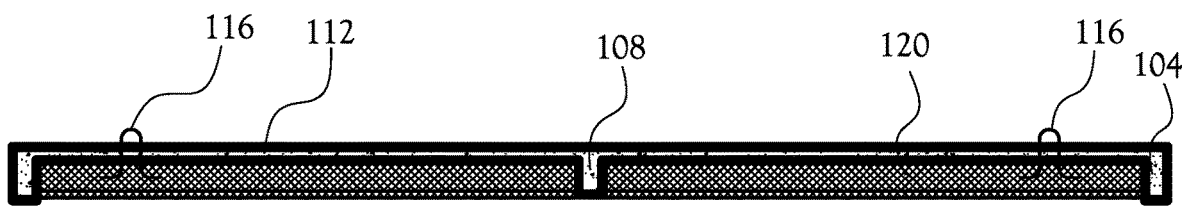
FIG. 12 illustrates a lengthwise section of the panel of FIG. 11.
Figure 13:
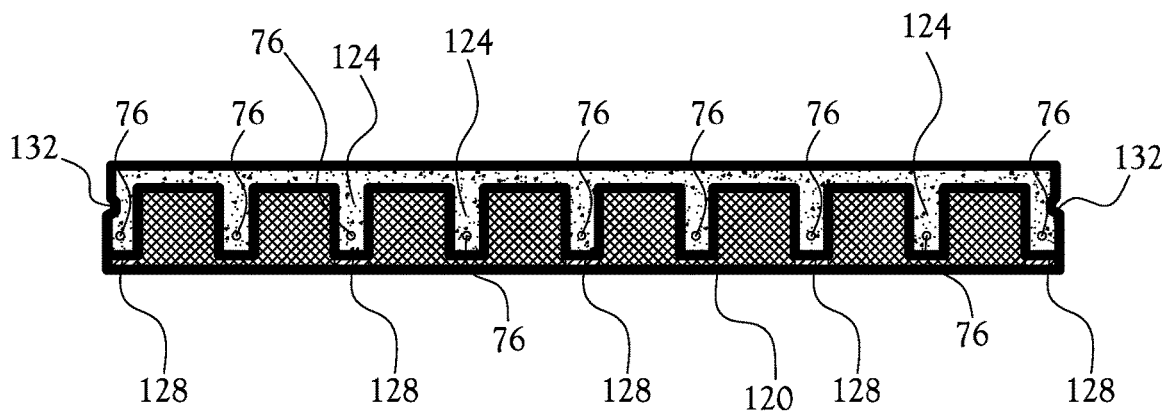
FIG. 13 illustrates a crosswise section of the panel of FIG. 11.
Figure 14:
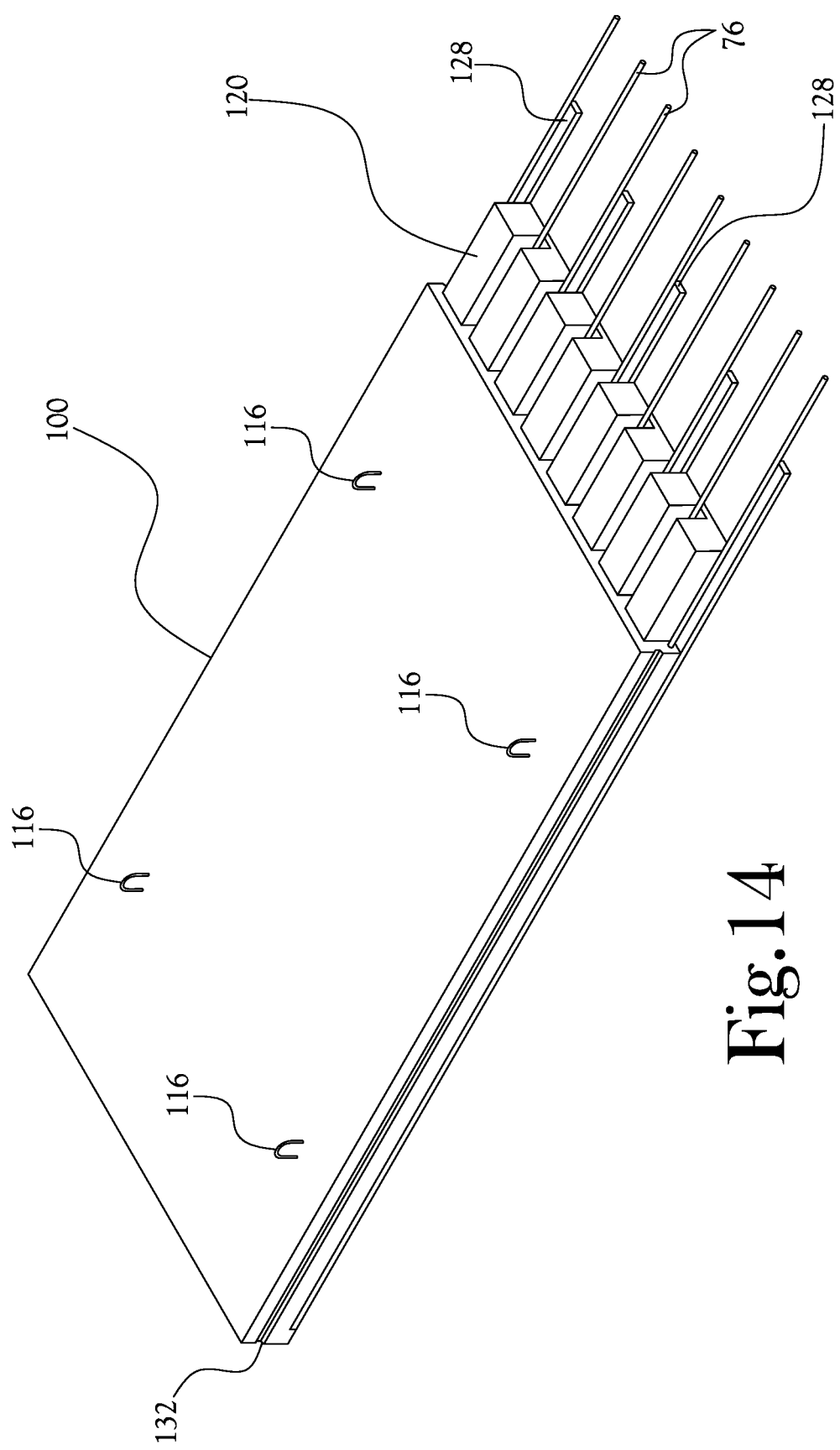
FIG. 14 illustrates a perspective view of the panel of FIG. 11 with a partial breakout to show some of the inner components of the panel.

FIG. 11 illustrates a plan view of a panel according to an example embodiment of the present general inventive concept, FIG. 12 illustrates a lengthwise section of the panel of FIG. 11, FIG. 13 illustrates a crosswise section of the panel of FIG. 11, and FIG. 14 illustrates a perspective view of the panel of FIG. 11 with a partial breakout to show some of the inner components of the panel. The example embodiment illustrated in FIGS. 11-14 is a panel with no soffit. As can be seen from FIGS. 11-14, the panel 100 is similar to the example embodiments illustrated in FIGS. 1-10, but is formed without a stud frame. As illustrated in the plan view of FIG. 11, the panel 100 has bearing closures 104 provided across the entirety of both respective ends of the panel 100. These bearing closures 104 are analogous to the top beam 38 and toe 40 illustrated in FIGS. 1-3. An intermediary beam 108, which may be referred to herein as a web stiffener, is provided across the panel 100 at approximately the center point of the panel 100. In various example embodiments of the present general inventive concept, the panel 100 may be formed with a length of 10 feet from an end of the panel 100 to a center of the intermediary beam 108, but placement of such a beam in other example embodiments may vary. As a floor or roof panel is likely to encounter more forces acting in a direction perpendicular to a face of the panel 100, such intermediary beams 108 may be more necessary than would be needed for a wall panel. The web stiffener or intermediary beam 108 may be provided with a reinforcement component such as rebar, prestressing strand, wire, etc., to produce increased structural support against flexing or other undesired forces. Although the example embodiment in FIG. 11 illustrates one intermediary beam 108, or web stiffener, proximate the center of the panel 100, other example embodiments of the present general inventive concept may include no or more intermediary beams, and/or may vary in the placement of the beam(s). The longitudinal section of the panel 100 illustrated in FIG. 12 shows the bearing closures 104, as well as the web stiffener 108, which in various example embodiments may each have a width of approximately 4 inches. FIG. 12 also shows the upper surface of the panel having a face 112 which may have, for example, a thickness of approximately two inches. Similar to the previously described example embodiments, the face, bearing closures, and web stiffener are formed of concrete. However, it is understood that different example embodiments may include more or fewer components, and may have different dimensions, than those illustrated in FIGS. 11-14 without departing from the scope of the present general inventive concept.

As illustrated in FIG. 12, the web stiffener 108 of this example embodiment does not extend as far from the face 112 of the panel 100 as do the bearing closures 104 formed at each end of the panel 104. This configuration may be formed by the forming member 120 used in the construction of the panel 100, in which the forming member defines a channel in which the web stiffener 108 is formed. As discussed herein, the forming member 120 may be of single piece construction, or may include several separately formed components depending upon the desired configuration and features. FIG. 12 also illustrates lifting devices 116 such as lift hooks that may be formed to aid in the lifting and otherwise moving, installation, etc., of the panel 100. The lifting devices may vary according to different example embodiments and/or desired usage, and may be simply omitted in various example embodiments of the present general inventive concept.

As illustrated in FIG. 13, the forming member 120 defines a plurality of parallel and evenly spaced channels in which concrete joists 124 are formed. In various example embodiments of the present general inventive concept, the forming member 120 may be constructed of any of a host of types of insulation, but are preferably structurally robust enough for concreted to be poured over without being deformed. As illustrated in FIG. 13, every other concrete joist 124 is provided with a nailer strip 128 on the face thereof, such as, for example, a P.T. 2×4 nailer strip, for attaching other surface fixtures/bodies/members to a bottom face of the panel. In various example embodiments of the present general inventive concept, wooden 2×4's may be employed as the nailer strips 128. It is understood that "upper" and "bottom" surface terms are used relative to the orientation illustrated in FIGS. 11-14, and the panel 100 may be used in different orientations such as, for example, the discussed "upper" surface facing a bottom of an installation. To provide the nailer strips 128 to the panel, the insulation forming member 120 may actually include a number of separately formed components. For example, to produce the example embodiment illustrated in FIG. 13, four separate forming member 120 components may be employed. Each of the four separate forming members 120 may define a central longitudinal channel in which an entire concrete joist 124 may be formed, and a centrally defined cross channel in which the previously described web stiffener 108 may be formed. By alternating these forming member 120 components with nailer strips 128, and arranging the components so that all are in flush contact with one another, the regularly spaced and formed concrete joists 124 may be formed in the channels defined therein. In various example embodiments, the nailer strips 128 may be formed integrally with the insulation components of the forming member 120 to provide a single piece construct. As indicated in FIG. 14, each of the concrete joists may have reinforcing members 76 such as, for example, rebar, prestressing strand, wire, etc., formed therein to provide enhanced structural support. Multiple strands of rebar or other structural components may be employed in each web location, and depth placement of the structural components may vary according to various example embodiments of the present general inventive concept. As illustrated in FIG. 14, rebar has been placed in each of the channels defined by the forming member(s), in which the concrete joists are formed, to act as the reinforcing members 76.

As illustrated in FIG. 13, grout keyways 132 may be formed on the respective outer surfaces of the outermost concrete joists 124 to improve the connection of panels 100 to one another. The grout keyways 132 may be formed by protusions in the casting bed in which these panels 100 are formed. In the example embodiment illustrated in FIG. 13, the grout keyways 132 may be approximately 2 inches wide, and may start at a point approximately 3 inches from the upper surface of the panel. As also illustrated in FIG. 13, the width of the portion of the outermost concrete joists 124 between the grout keyway 132 and the upper surface may be approximately ½ inch smaller than width of the concrete joist 124 below the grout keyway 132. Such an indention may also be formed in the casting bed, and may be formed by the same protrusions respectively forming the grout keyways 132.

The forming of a panel such as that illustrated in FIGS. 11-14 may in various example embodiments be very similar to the process previously described in relation to FIGS. 4-6, albeit without the inclusion of a stud frame. A casting bed defining the desired length, width, and thickness of the frame may be constructed and placed upon a flat forming surface. The inner surface of the lengthwise members of the casting bed may have formed thereon the protrusion(s) to form the grout keyways 132 of the panel, as well as the outer indentation of the upper part of the outermost concrete joists. In various example embodiments, a nailer strip 128 may be placed on the flat surface inside the casting bed and flush against one lengthwise member of the casting bed. Space may be left at either end of the nailer strip 128 to form the bearing closures 104. Such spacing may be actuated by other methods rather than simply leaving an empty space, in order to prevent the forming members 120 from movement during fabrication of the panel 100. Then a forming member 120 may be placed flush alongside the nailer strip 128, and the process may be repeated until the casting bed is filled. After the forming members 120 are placed, rebar or other structural components may be placed in the respective grooves or channels to act as reinforcing members 76 in the spaces that will form the concrete joists 124. The channels may be defined such that the concrete joists 124 will be parallel and evenly spaced across the width of the panel 100, and running end to end to the bearing closures 104. The insulation used in the forming members 120 may be one of the types mentioned in the previously described embodiments of the present general inventive concept. After placement of all the forming members 120 and structural reinforcements, uncured, flowable concrete is placed within the casting bed. The concrete is allowed to fill each of the channels of the forming members 120, the space at the longitudinal ends of the forming members 120, and to form the face 112 or upper surface over the forming members 120 to the desired thickness. The upper surface of the uncured concrete may be finished to a desired surface as described in the previous example embodiments of the present general inventive concept. Upon removal from the casting bed, or upon removal of the casting bed, the panel 100 will have the form illustrated in FIGS. 11-14.

Figure 15:
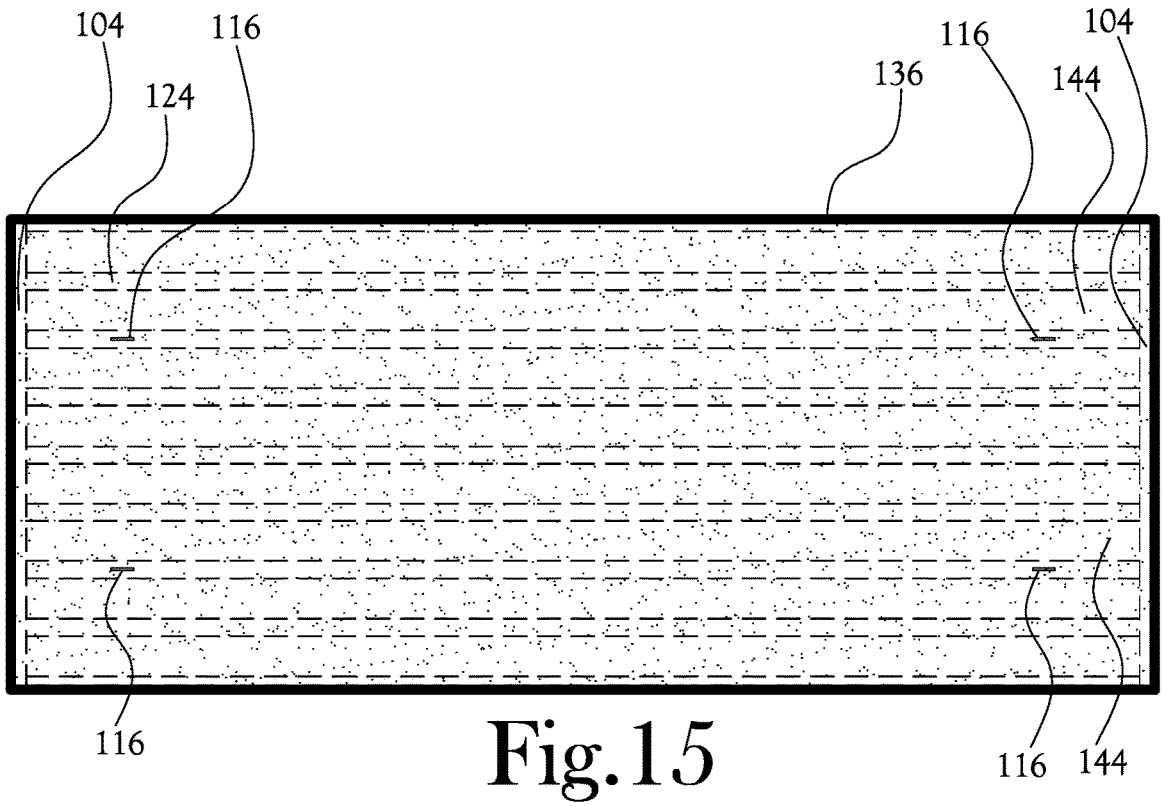
FIG. 15 illustrates a plan view of a panel according to another example embodiment of the present general inventive concept.
Figure 16:
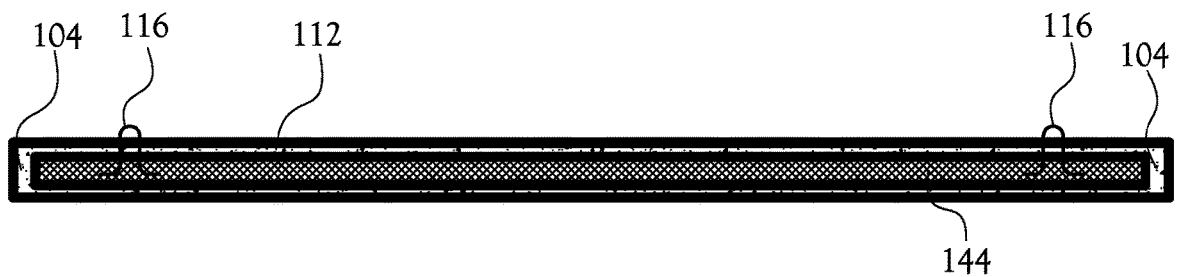
FIG. 16 illustrates a lengthwise section of the panel of FIG. 15.
Figure 17:
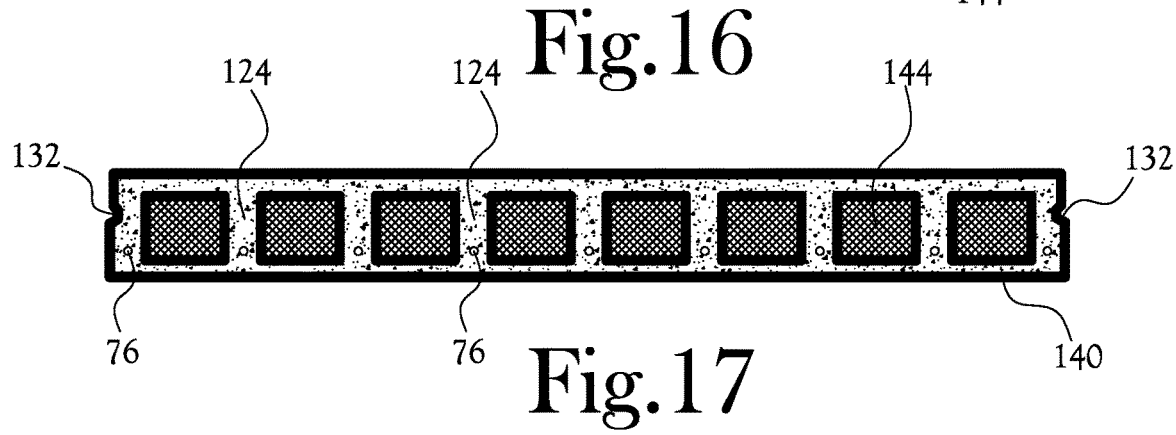
FIG. 17 illustrates a crosswise section of the panel of FIG. 15.
Figure 18:
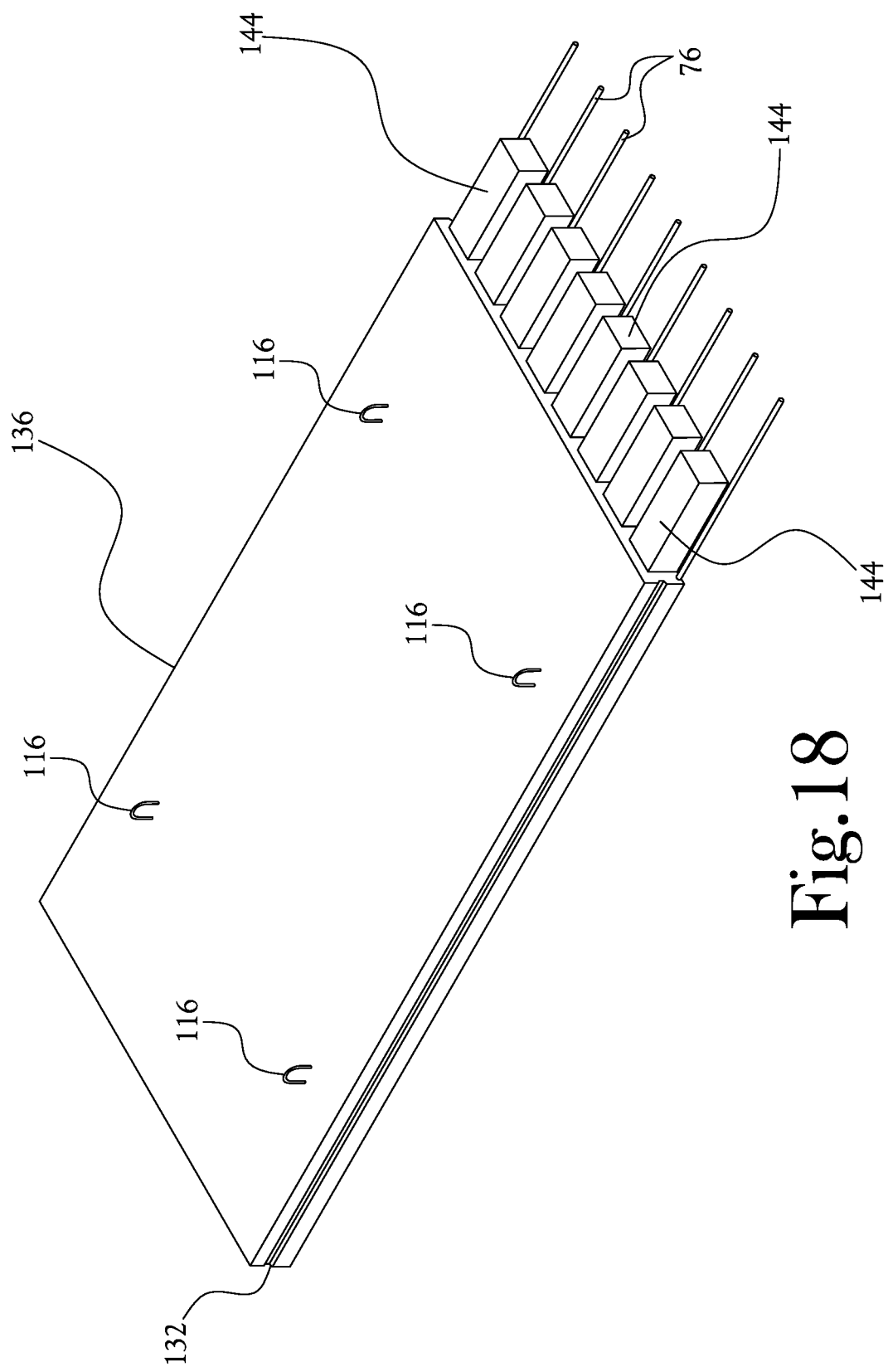
FIG. 18 illustrates a perspective view of the panel of FIG. 15 with a partial breakout to show some of the inner components of the panel.

FIG. 15 illustrates a plan view of a panel according to another example embodiment of the present general inventive concept, FIG. 16 illustrates a lengthwise section of the panel of FIG. 15, FIG. 17 illustrates a crosswise section of the panel of FIG. 15, and FIG. 18 illustrates a perspective view of the panel of FIG. 15 with a partial breakout to show some of the inner components of the panel. The example embodiment panel 136 illustrated in FIGS. 15-18 is similar to the example embodiment illustrated in FIGS. 11-14, except that a concrete soffit 140 is provided to the panel 136. Thus, rather than having a lower surface formed of insulation and nailer strips, the lower surface will be formed uniformly with concrete that may be the same as the upper surface or face 112 of the panel 136. To form such a panel 136, in which insulation portions 144 acting as forming members are "floating" inside the concrete wall, in various example embodiments an approximately 2 inch layer of concrete is poured into the casting bed before the forming members or insulation portions 144 of the panel 136 are placed therein. This lower sheet of concrete will form the soffit 140 of the panel 136. After the lower sheet of concrete has hardened to a desired state so as to support the weight of the forming members or insulation portions 144 and concrete poured thereon, the insulative forming members 144 are placed at regular intervals in the casting bed on top of the soffit 140 such that channels are defined therebetween in which concrete joists 124 will be formed. As in the example embodiment illustrated in FIGS. 11-14, space may be left at each end for the bearing closures 104, and approximately 4 inch spaces may be left between each of the forming members 144, and between the outermost forming members 144 and the casting bed, to define the channels in which the concrete joists 124 will be formed. In various example embodiments, methods of maintaining the spacing may be employed to keep the forming members 144 in place during the pouring of the uncured concrete. The structural reinforcement components 76 and lift hooks 116 may be placed as in FIGS. 11-14, and the uncured concrete is poured over the forming members 144. In the example embodiment illustrated in FIGS. 15-18, no intermediate beam or web stiffener is included at a center of the panel 136, as the soffit 140 will provide additional structural support for the panel 136. However, in various example embodiments of the present general inventive concept, one or more such web stiffeners may be provided. Various example embodiments of the present general inventive concept may employ connection components to assist the soffit 140 and the later poured concrete to adhere to one another. In various example embodiments of the present general inventive concept, the soffit layer 140 may be added after the upper layer has been formed by simply inverting the partially poured panel and adding the soffit layer 140 atop the panel 136 in a casting bed. In the example embodiment illustrated in FIGS. 15-18, the soffit layer 140 is approximately 2 inches thick, but various example embodiments of the present general inventive concept may provide soffits of various thicknesses. The soffit 140 may be finished to a desired surface as described in the previous example embodiments of the present general inventive concept.

While various example embodiments of the present general inventive concept described thus far have included a precast wall structure typically having a concrete outer surface, which may be used, for example, in an underground or partially underground situation in which the outer surface of the wall structure is not seen or not aesthetically important, other various example embodiments of the present general inventive concept may include a prefabricated wall veneer that may be adhered to the outer concrete surface to provide a more aesthetically pleasing precast wall structure, and/or stylings formed in the outer concrete surface to provide various types of facades. Such prefabricated wall veneers may be formed to have a host of different looks, such as, for example, brick, stone, stucco, ribbed or other raised and/or unraised geometric patterns, etc. The different desired looks/textures of the veneers may be formed by stamping during production of the veneer panels. These prefabricated wall veneers may be fixed to a precast wall structure during the production of the precast wall structure to provide a desired look for an outside wall of a building employing the precast wall structure. The prefabricated wall veneers may be formed of wood composite and/or other composite materials which resist damage from moisture, rot, splitting, pests, and so on, while providing many years of maintenance free use. By forming the veneers to a desired look, painting and other types of general maintenance may be avoided.

Figure 19:
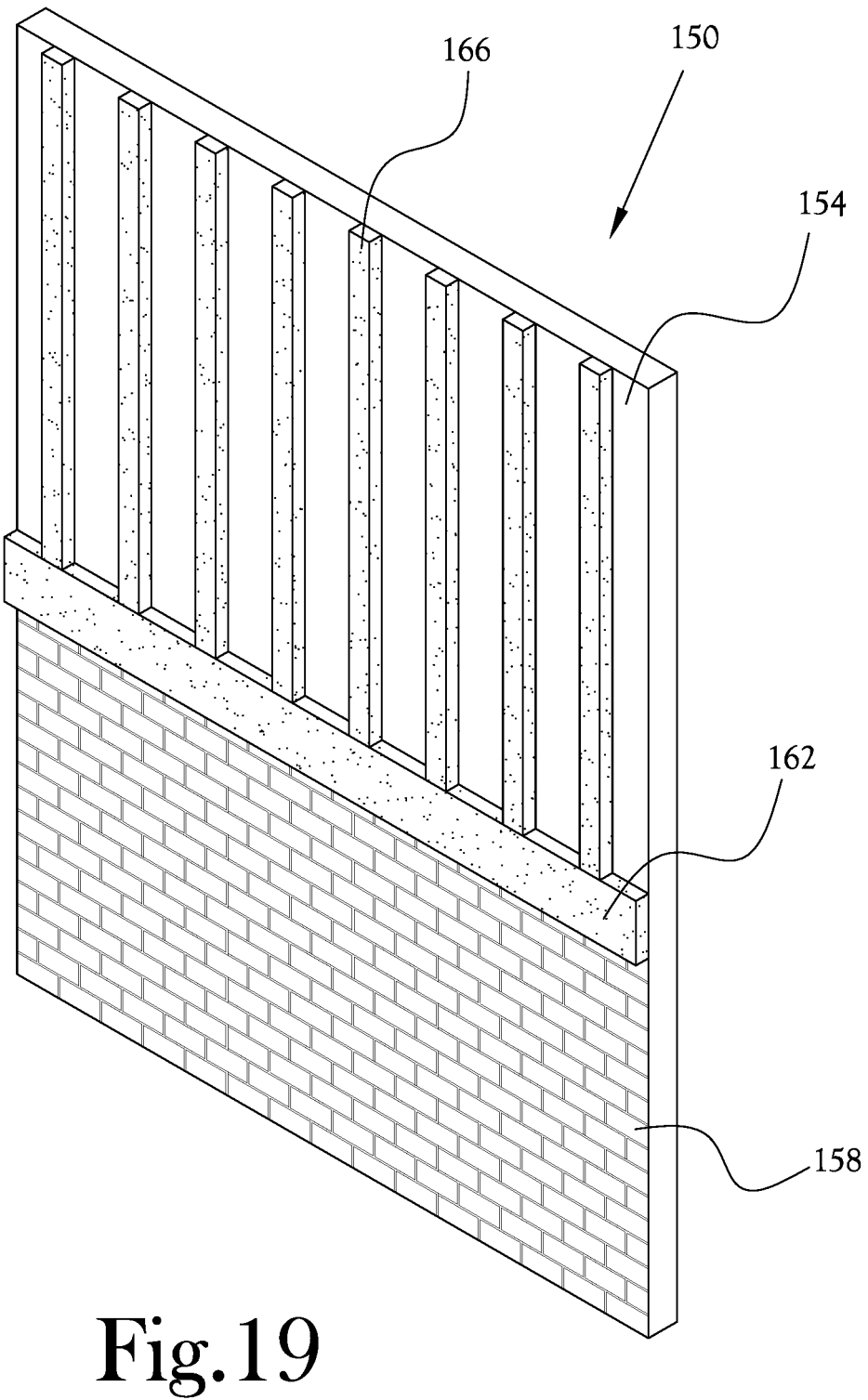
FIG. 19 illustrates a perspective view of a prefabricated wall with a veneer according to an example embodiment of the present general inventive concept.

FIG. 19 illustrates a perspective view of a prefabricated panel with a veneer according to an example embodiment of the present general inventive concept. In this example embodiment the prefabricated wall and veneer 150 is configured to have an outer façade with two different decorative portions, including an upper portion having trim members such as a horizontal trim member 162 and a plurality of vertical trim members 166, and a lower portion having a brick pattern 158. Portions of concrete 154 of the panel 150 not adorned by the veneer are shown between the vertical members 166. In this example embodiment the horizontal trim member 162 is configured as a frieze board, and the vertical trim members 166 are configured as batten strips, but various example embodiments may have a host of differently configured trim members, or no trim members at all. It is understood that the façade of the prefabricated wall and veneer 150 discussed herein may have any of a number of different surface looks, thicknesses, feel, etc., and may have fewer or more decorative areas than described herein. Various portions of the veneer may be configured to be fixed to the concrete 154 during the forming of precast concrete wall structure, and may have anchoring members that extend into the concrete 154 (as described further herein). In the example embodiment illustrated in FIG. 19, the brick pattern 158 is embedded into the concrete 154, but in various example embodiments the brick pattern itself may be an external façade affixed to the concrete 154 of the panel 150.

Figure 20A:
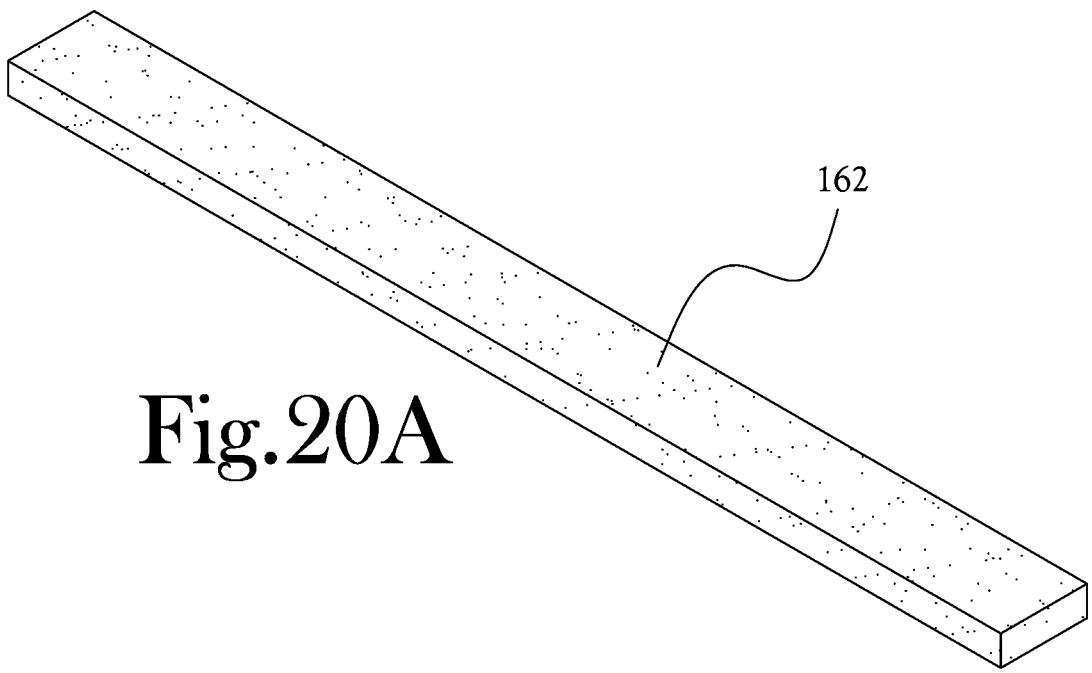
FIGS. 20A-D illustrate the preparation of the horizontal trim member of FIG. 19 according to an example embodiment of the present general inventive concept.
Figure 20B:
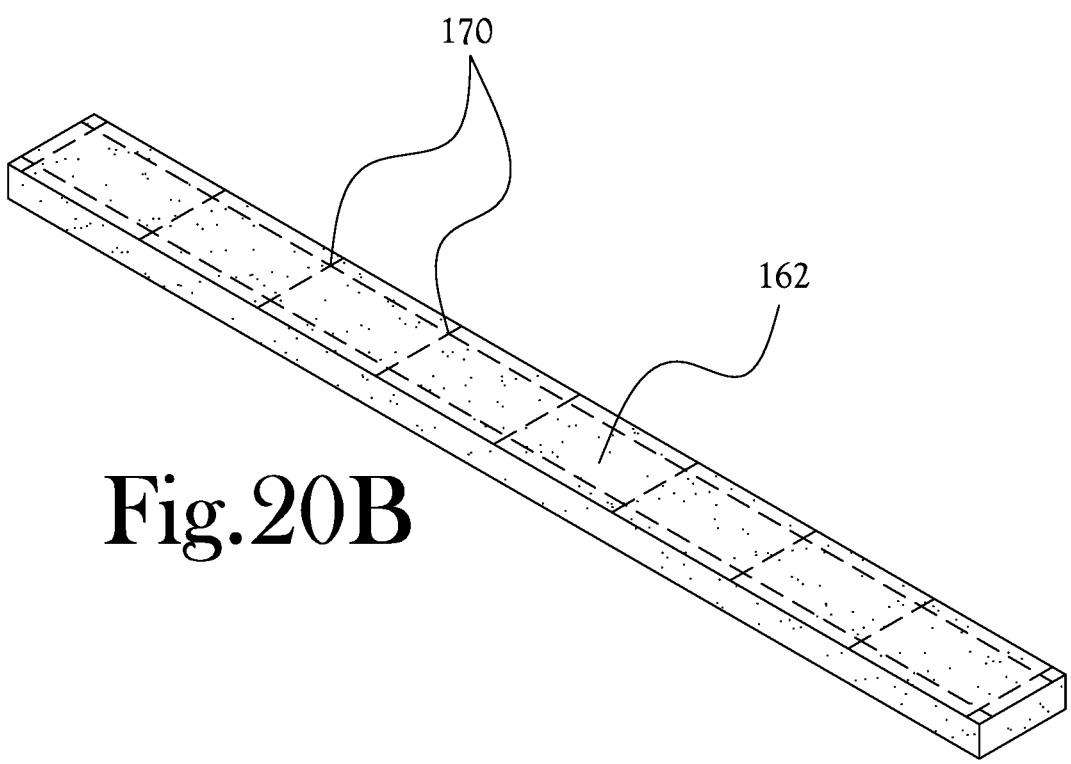
Figure 20C:
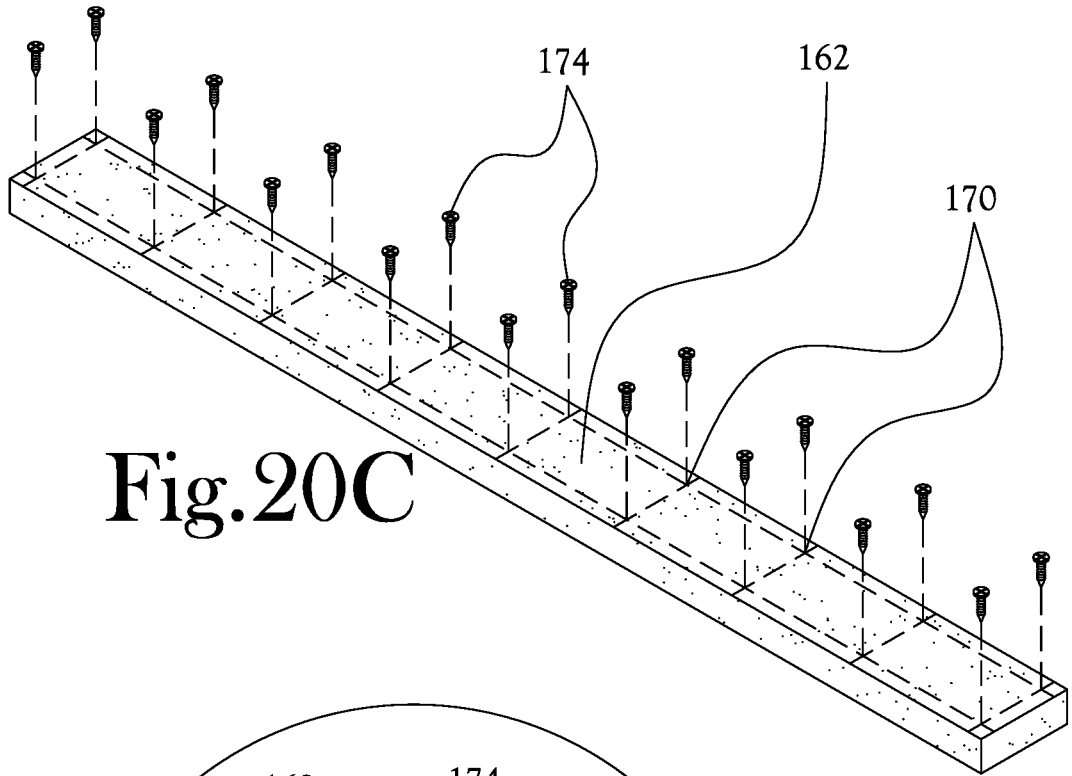
Figure 20D:
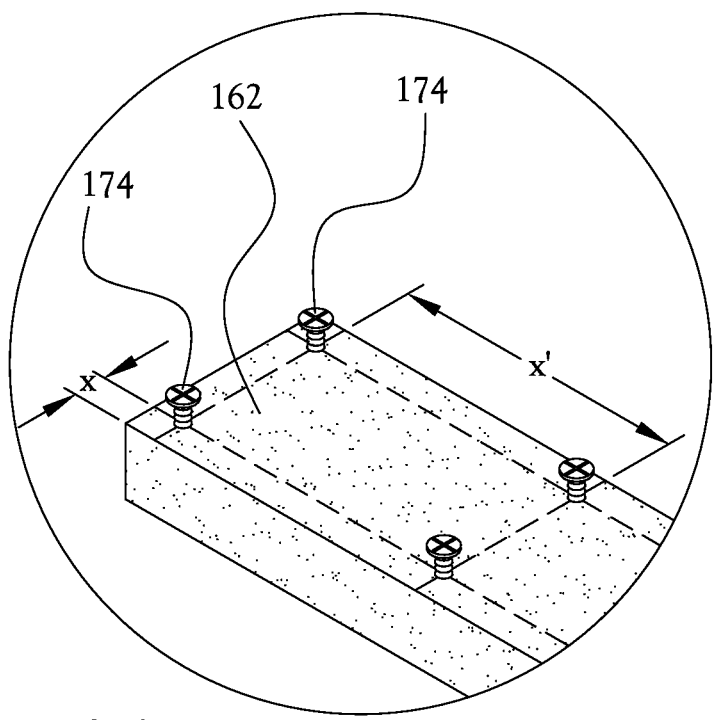

FIGS. 20A-D illustrate the preparation of the horizontal trim member 162 of FIG. 19 according to an example embodiment of the present general inventive concept. As previously described, the horizontal trim member 162 of this example panel 150 is configured as a frieze board, and serves as a border between the brick pattern 158 and the vertical trim members 166. The horizontal trim member 162 of FIG. 20A has been cut to the desired size, e.g., having a length corresponding to the width of the prefabricated panel 150, and coated with a sealant, as the trim member 162 may be exposed to outside weather elements. In this example embodiment the horizontal trim member 162 is coated with a bituminous coating as a sealant, but it is understood that different sealants may be used without departing from the scope of the present general inventive concept. FIG. 20B shows markings made on the horizontal trim member 162 to determine anchor points 170 for the anchor members 174 shown in FIG. 20C. In this example embodiment, the anchor members 174, an thus the anchor points 170 at which the anchor members 174 will be affixed, are to be attached to the horizontal trim member 162 at substantially nine-inch intervals along the length of the horizontal trim member 162, and substantially one inch from the border of the horizontal trim member 162. Thus, as shown, an assembler has measured the one-inch and nine-inch intervals along the length of the board, and the cross sections of the markings are the anchor points 170 at which the anchor members 174 are attached. In various example embodiments these described anchor point 170 intervals may be used with any trim member that is wider than four inches. FIG. 20D illustrates the anchor members 174 attached to the horizontal trim member 162 at those anchor points 170. In this example embodiment the anchor members 174 are anchor screws that are screwed into the horizontal trim member 162, and the heads of the anchor screws are wholly encased in the concrete 154 into which the anchor members 174 extend. Various example embodiments may provide a host of different anchor points and/or configurations of anchor members. In this example embodiment, the horizontal trim member 166 and vertical trim members 166 may be formed of a composite material such as MIRATEC®, and may simply be a non-structural decorative trim. After the anchor members 174 have been screwed into the horizontal trim member 162, additional sealant may be provided about the insertion point of the anchor members 174 to seal the opening created by attaching the anchor members 174.

Figure 21A:
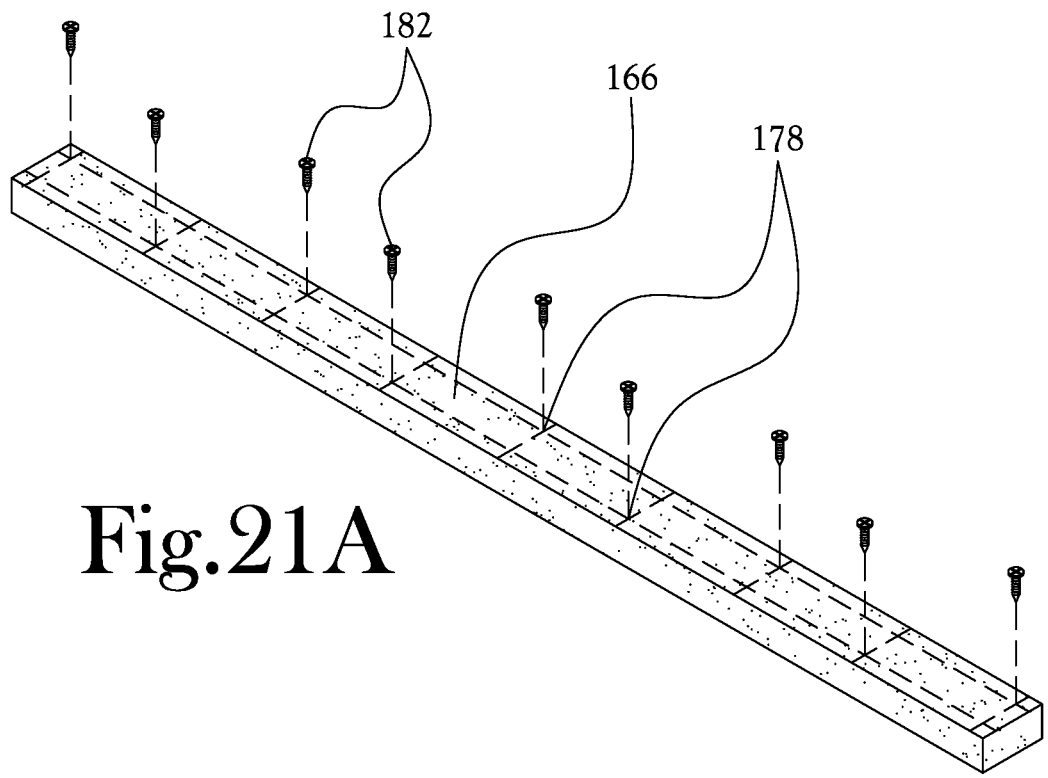
FIGS. 21A-B illustrate the preparation of the vertical trim members of FIG. 19 according to an example embodiment of the present general inventive concept.
Figure 21B:
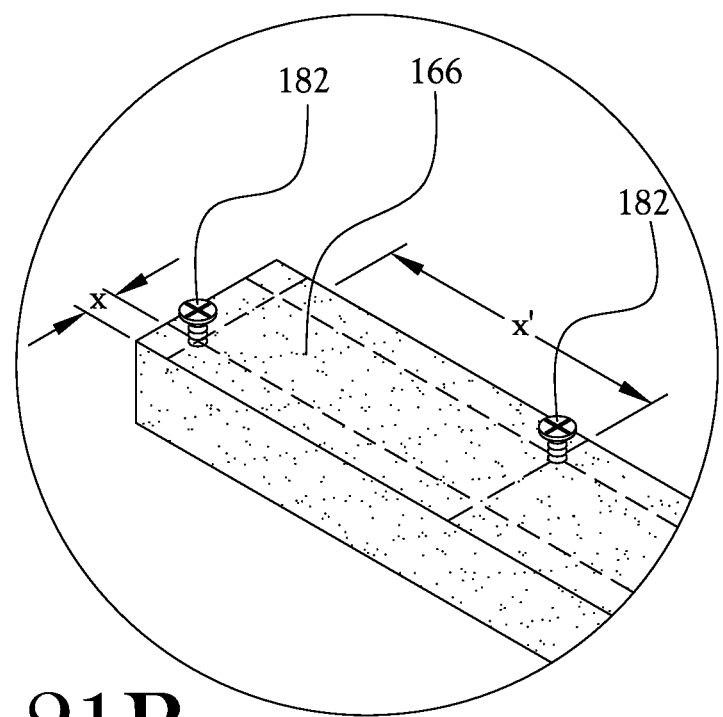

FIGS. 21A-B illustrate the preparation of the vertical trim members of FIG. 19 according to an example embodiment of the present general inventive concept. Similarly to the preparation of the anchor points 170 in FIG. 20B, in FIG. 21A anchor points 178 are provided at nine inch intervals along the length of the vertical trim members 166, and one inch from the edge of the vertical trim members 166. However, in this example embodiment, trim members having a width of less than 4" may have anchor members 182 in the staggered pattern shown in FIG. 21B, in which the anchor members 182 are provided in an alternating pattern as shown, with the anchor members 182 skipping every other anchor point such that no two anchor members 182 are side by side on the batten strips or vertical trim members 166. After this preparation, the horizontal trim members 162 and vertical trim members 166 are ready to be placed in the curing concrete, so that they are anchored in place when the concrete 154 is dried.

Figure 22A:
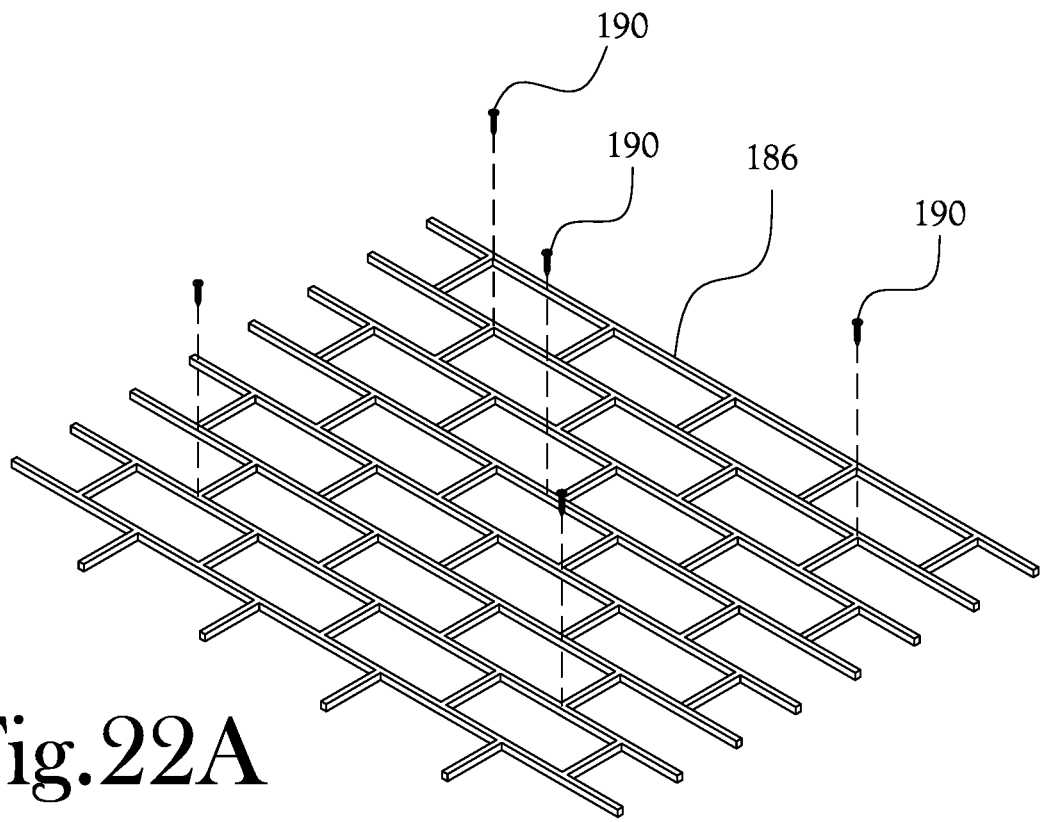
FIGS. 22A-B illustrate the preparation of a brick stamp used to form the brick pattern of FIG. 19 according to an example embodiment of the present general inventive concept.
Figure 22B:
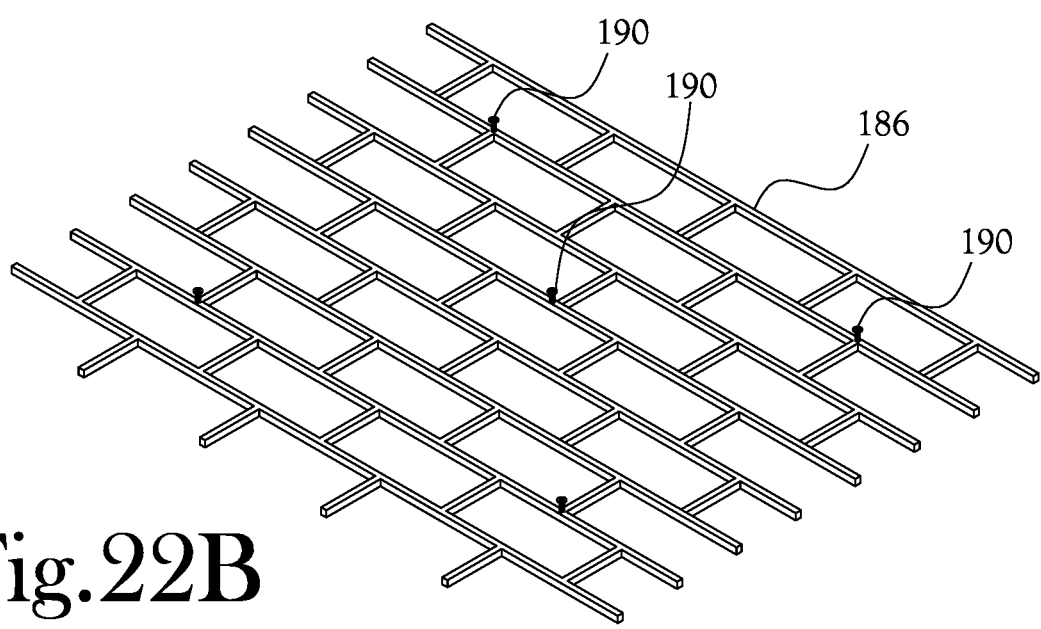

FIGS. 22A-B illustrate the preparation of a brick stamp used to form the brick pattern of FIG. 19 according to an example embodiment of the present general inventive concept. As illustrated in FIGS. 22A-B, a brick stamp 186 is cut to a desired size for the wall and veneer panel 150. The brick stamp 186 is a model of a brick pattern that may be placed in the drying concrete to form the brick pattern 158 shown in FIG. 19. As illustrated, the brick stamp 186 is a skeletal structure in which the body of the brick stamp 186 corresponds to the mortar between the bricks, and the open spaces of the brick stamp 186 correspond to the bricks themselves. In various example embodiments the thickness of the brick stamp 158 corresponds to the desired depth of the mortar in the gaps between the bricks in the brick pattern 158. In this example embodiment a plurality of the brick patterns 158 are cut to a desired size such that they all may be placed on the curing concrete to form the overall brick pattern 158 shown in FIG. 19. In various example embodiments a brick pattern may be cut that is large enough to only use that one brick pattern in the formation of the panel 150, but using a plurality of smaller brick patterns 158 as described herein may be more convenient for the assembler/fabricator to place in, and remove from, the curing concrete. As illustrated in FIGS. 22A-B a plurality of grip members 190 are attached to the brick pattern 158 to provide the assembler a convenient point to hold in order to manipulate the brick patterns 158 into and out of the curing concrete. In this example embodiment, the grip members 190 are screws that are screwed in the brick pattern 158 close to each corner, with one in the middle, to provide a plurality of conveniently located grips for the assembler, but it is understood that a host of different grip members may be used, as well as in a host of different configurations, without departing from the scope of the present general inventive concept. In various example embodiments pattern stamps other than a brick pattern may be provided to form facades on the panel, and such stamps may be configured to be removed before the concrete is fully cured, or to remain in place after the concrete is fully cured.

Figure 23A:
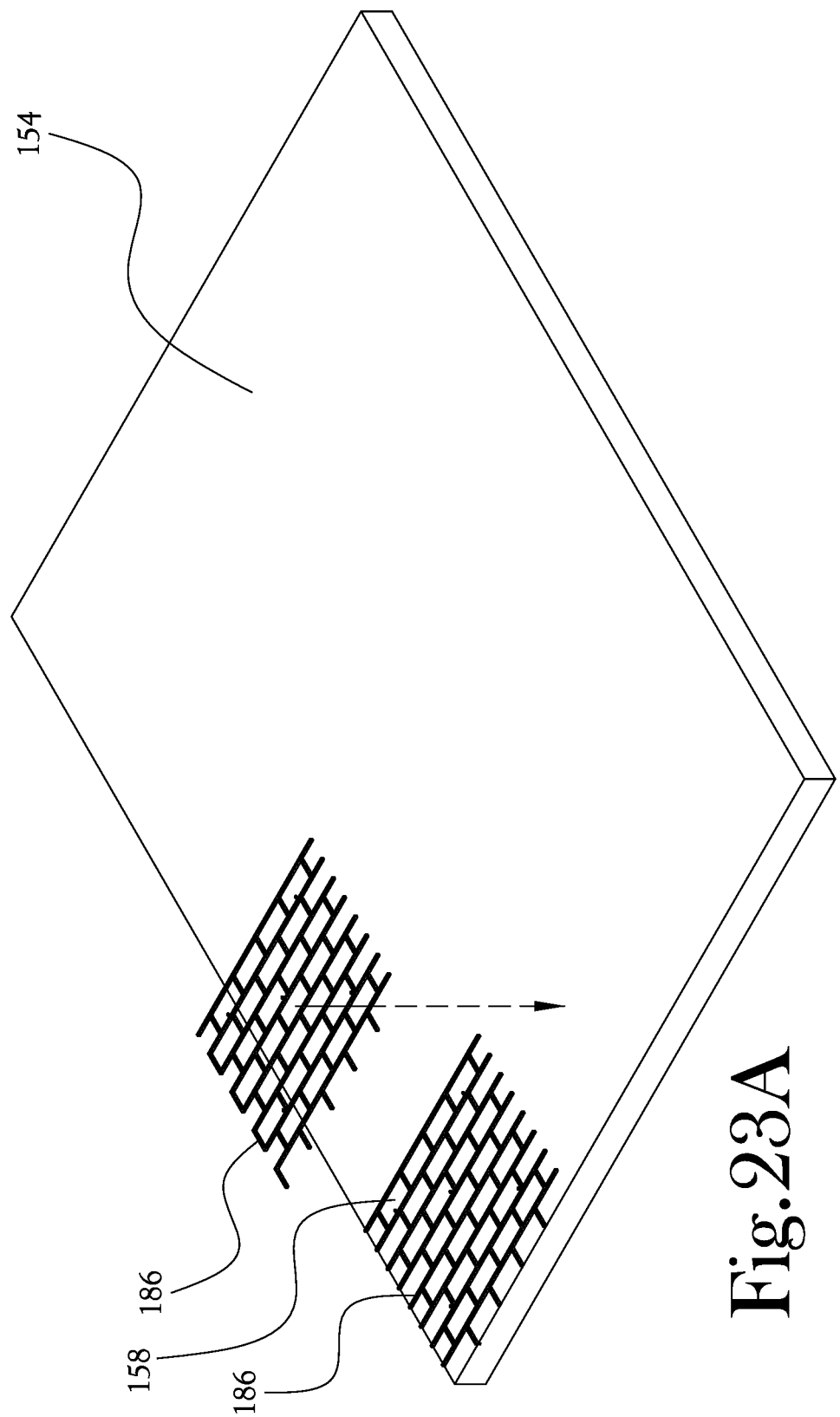
FIGS. 23A-D illustrate the forming of the prefabricated wall with the veneer of FIG. 19 according to an example embodiment of the present general inventive concept.

FIGS. 23A-D illustrate the forming of the prefabricated wall with the veneer of FIG. 19 according to an example embodiment of the present general inventive concept. In FIG. 23A, the concrete 154 has been freshly poured, and may have been poured over any of the various structures previously described herein to form various internal portions and/or the interior surface of the wall panel 150, and thus has a substantially planar upper surface on which to form the veneer portion or portions. In FIG. 23A the brick stamps 186 are placed in the curing concrete 154. An assembler may use the grip members 190 to easily place the brick stamps 186 in the concrete 154, and as shown the brick stamps 186 may be cut so that they correspond to each adjacent brick stamp 186 to form a proper brick pattern 158, including the edges between panels 150. After placing the brick stamps 186 in the curing concrete, they may be tamped down until the upper surface of the brick stamps 186 is substantially flush with the upper surface of the curing concrete 154, so as to provide desired and uniform depth of the "mortar" between the "bricks."

Figure 23B:
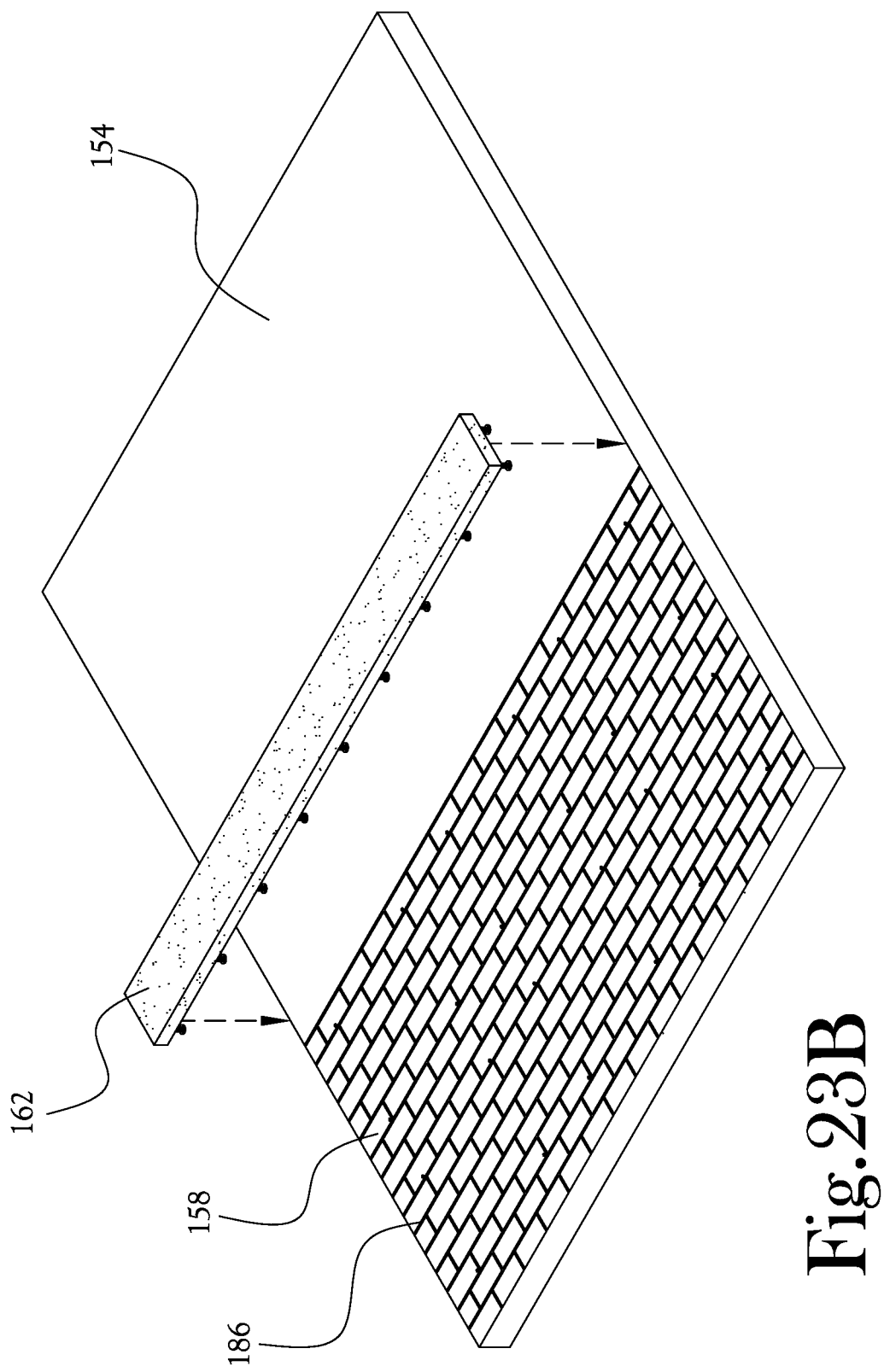
Figure 23C:
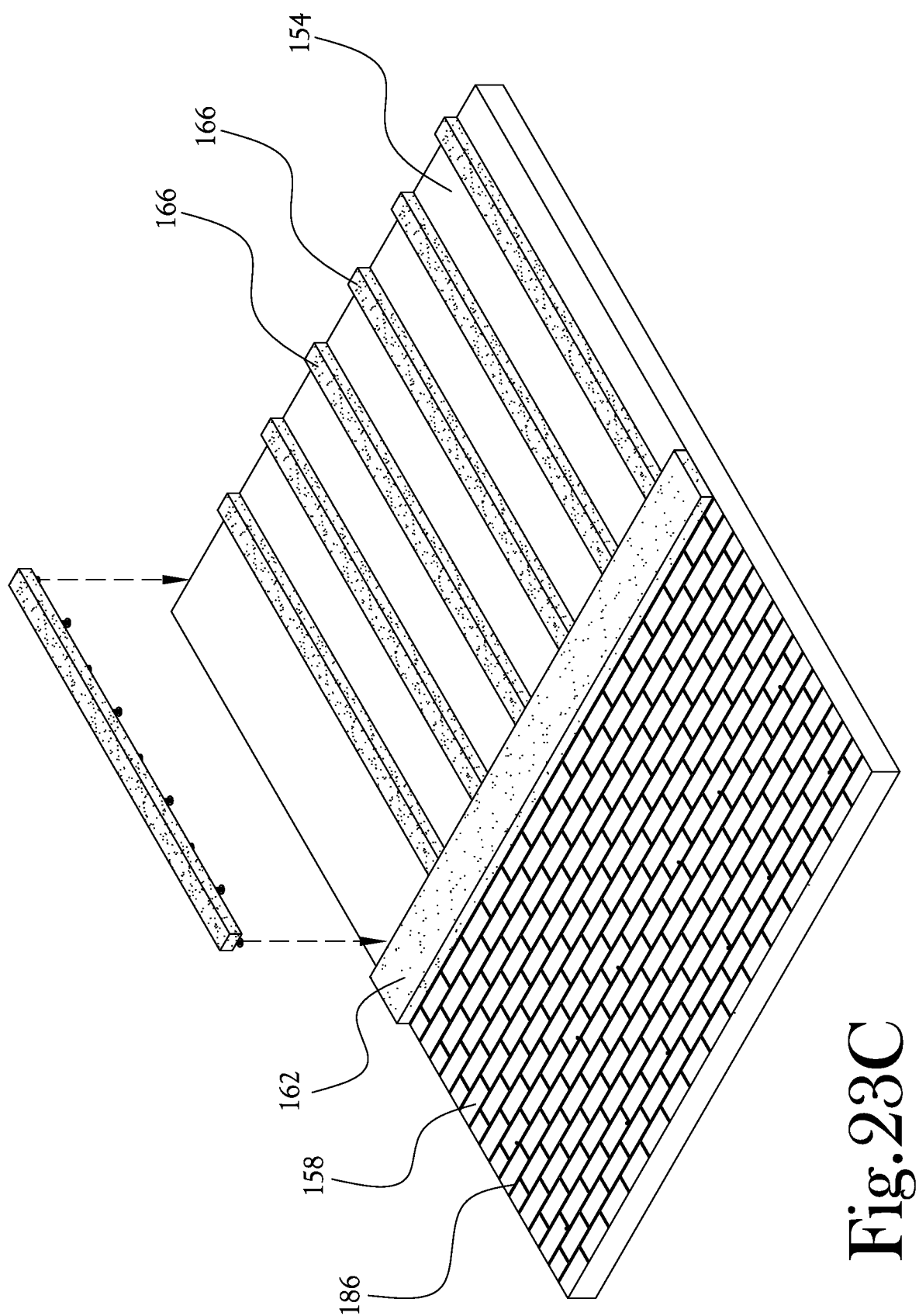

In FIG. 23B, after the brick stamps 186 have been placed in the concrete, the frieze board, or horizontal trim member 162, is placed on the curing concrete 154 such that the bottom surface of the horizontal trim member 162 contacts the upper surface of the curing concrete 154, and the anchor members 174 extend down into the curing concrete 154. In this example embodiment the horizontal trim member 162 is placed immediately adjacent to the edge of the brick stamps 186 that will form the "top" of the brick pattern 158 relative to the finished panel 150 being stood upright. In FIG. 23C, the batten strips, or vertical trim members 166 are placed such that the "lower" edges contact an "upper" edge of the horizontal trim member 162, the bottom surface of the vertical trim members 166 contact the upper surface of the curing concrete 154, and the anchor members 182 extend down into the curing concrete. The horizontal trim member 162 may be cut so that the ends of the horizontal trim member 162 meet corresponding ends of horizontal trim members of other panels, and the vertical trim members 166 may be arranged such that the gaps between the vertical trim members 166 of the panel 150 are substantially uniform, and that gaps between the outermost vertical trim members 166 and outermost vertical trim members 166 of other panels substantially match the gaps between the adjacent vertical trim members 166 of the panel 150. Thus, trim members are fixed to the precast wall structure at various points, and are prevented from warping or other such unwanted movement. The extended anchoring members 174,182 may be provided in a number of forms and configurations. For example, the anchoring members may be formed of the same composite material as the trim members, and formed at the same time as the trim members. In other example embodiments, the anchoring members may be attached to the trim members after the production of the trim members. In the example embodiment of the present general inventive concept, the anchoring members may be panhead screws that are screwed partially into the trim members such that the head of the panhead screws may be embedded in the poured concrete of the precast wall structure to provide anchoring of the trim members to the precast wall structure. In other various example embodiments, the anchoring members/extensions may be formed with barbs, ribs, annular flanges, one or more tapering portions, etc., or any combination of such protrusions and/or open spaces in the anchoring members, which allows the wet concrete to surround, fill, etc., one or more portions of the anchoring members to provide an anchoring action. The quantity and/or configuration of the anchor members 174,182 may vary according to various example embodiments of the present general inventive concept.

Figure 23D:
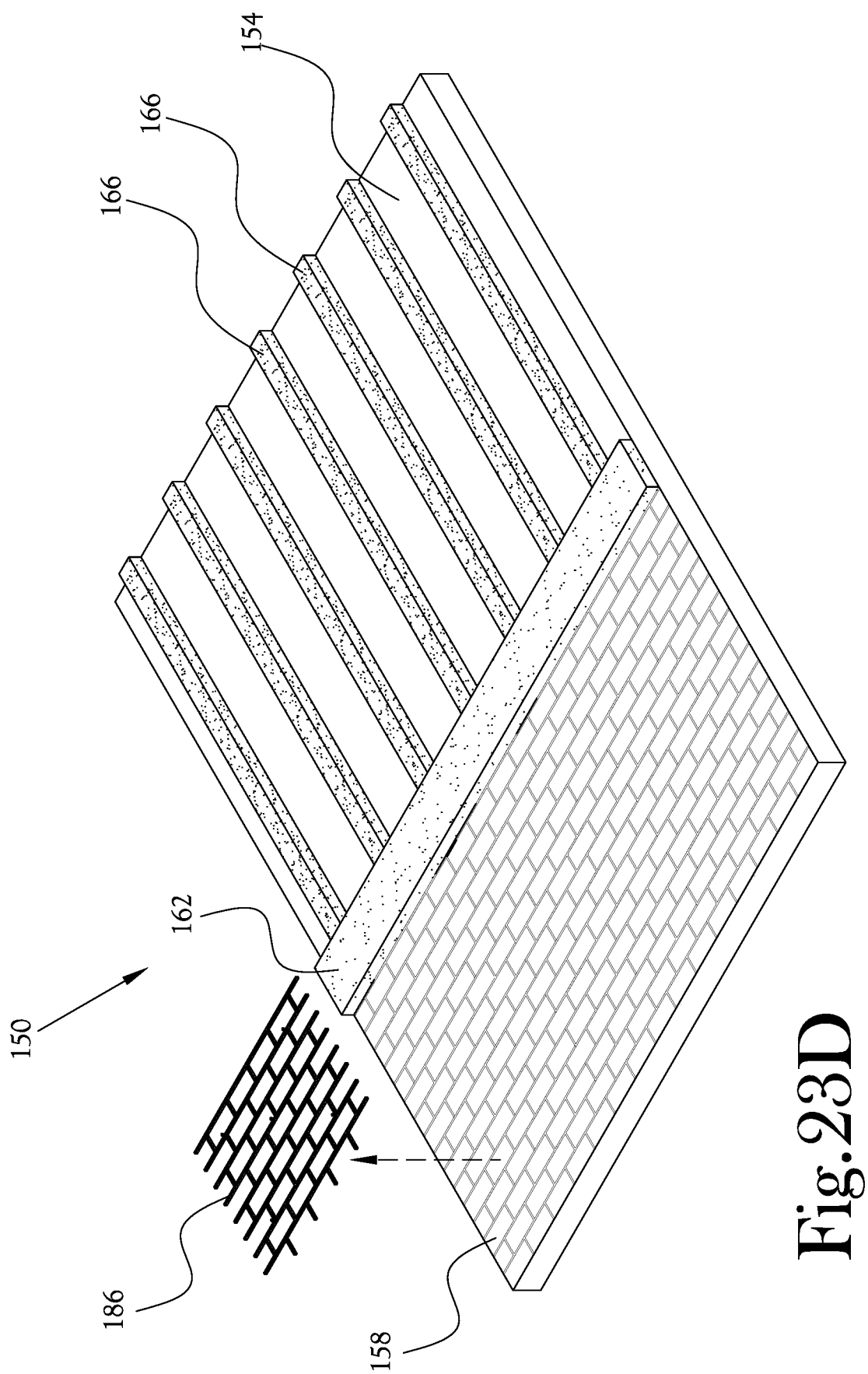

As illustrated in FIG. 23D, when the concrete is ready, such as being firm enough to hold the shape imprinted by the brick stamps 186 but not completely firm, the brick stamps 186 may be lifted straight up from the upper surface of the concrete 154, leaving the brick pattern 158 formed in the curing concrete. After the concrete 154 is completely dried, the panel 150 may be stood up to a vertical position, resulting in the panel 150 illustrated in FIG. 19.

Various example embodiments of the present general inventive concept may provide a method of forming the panel to be used as a floor, wall, or roof structure including positioning one or more forming members within a casting bed having a plurality of upright surfaces defining a generally rectangular interior area, the one or more forming members comprising an insulating material extending along a length dimension of the one or more forming members to define a plurality of rectangular-shaped channels in a parallel and spaced-apart relationship, placing uncured concrete within the casting bed and allowing the concrete to cover the one or more forming members and substantially fill the channels, and allowing the concrete to cure. The method may further include positioning a plurality of nailer strips within the casting bed, wherein the one or more forming members may include a plurality of components separated from one another on at least one side by one of the nailer strips. The one or more forming members may include a plurality of nailer strips respectively provided adjacent to a bottom of a plurality of the channels. The nailer strips may be respectively provided to every other one of the channels. The method may further include at least one channel provided across a width of the forming member. The one or more forming members may include a layer of insulating material defining a plurality of integrally-formed rectangular protrusions extending along the length dimension of the one or more forming members in a parallel and spaced-apart relationship to one another to define the plurality of rectangular-shaped channels therebetween. The method may further include placing uncured concrete within the casting bed before positioning the one or more forming members therein, and allowing the concrete to cure. The one or more forming members may be completely encased in the concrete after the placing of the uncured concrete within the casting bed and allowing the concrete to cover the one or more forming members and substantially fill the channels. A protrusion may be formed along an inner surface of each of two lengthwise members of the casing bed such that a grout keyway is formed in lengthwise sides of the panel. The method may further include positioning a plurality of reinforcing members within the casting bed prior to placing the uncured concrete over the forming member.

Various example embodiments of the present general inventive concept may provide a panel to be used as a floor, wall, or roof structure, the panel including a concrete portion including a face portion and a plurality of joists extending inwardly from the face portion, and a plurality of insulating portions configured between each adjacent pair of the joists. The insulating portions may be configured to extend further from the face portion than the joists. The panel may further include a plurality of nailing strips provided respectively at ends of at least a plurality of the joists. Each of the insulating portions may be integrally formed with at least one adjacent insulating portion. The concrete portion may further include a back portion contacting ends of the joists opposite the face portion such that each of the insulating portions provided between the joists is completely surrounded by concrete.

Various example embodiments of the present general inventive concept may provide a method of forming a wall structure, the method including positioning a frame within a casting bed having a plurality of upright surfaces defining a generally rectangular interior area, the frame including first and second spaced apart members extending fully along a width dimension of the casting bed and a plurality of studs interconnecting the first and second spaced apart members, the studs each extending fully along a length dimension of the frame, positioning a forming member in overlying relation above the frame, the forming member including a one-piece layer of insulating material sized to extend fully along the width dimension of the casting bed and fully along a width dimension of the frame and to fully cover and encapsulate the frame within the casting bed, the forming member defining a plurality of integrally-formed rectangular protrusions, each said integrally-formed rectangular protrusion having a length dimension extending fully along a length dimension of the forming member and fully along the length dimension of the frame in a parallel and spaced-apart relationship to one another to define a plurality of rectangular-shaped channels therebetween, placing uncured concrete within the casting bed and allowing the concrete to cover the forming member and substantially fill the channels, and allowing the concrete to cure. The method may further include positioning the frame within the casting bed to provide a first space between the frame first member and a first upright surface of the casting bed and to provide a second space between the frame second member and a second upright surface of the casting bed. The method may further include positioning the forming member above the frame to provide a third space between the forming member and the first upright surface of the casting bed, and to provide a fourth space between the forming member and the second upright surface of the casting bed. The method may further include allowing uncured concrete to fill the first and third spaces to form a top beam portion of the wall structure and wherein uncured concrete is allowed to fill the second and fourth spaces to form a toe portion of the wall structure. The method may further include positioning a spacer between the frame first member and the third upright surface of the casting bed to form the first space. The spacer may be a strip of insulating material. The first and second upright surfaces of the casting bed may define structures shaped to allow the concrete to form matingly-shaped portions of a joint along opposite sides of the wall structure. The first upright surface may define a ridge extending along a length thereof and the second upright surface may define a matingly-shaped groove extending along a length thereof. The method may further include positioning a plurality of reinforcing members within the casting bed prior to placing the uncured concrete within the casting bed. The positioning of a plurality of reinforcing members may further include placing at least one reinforcing member along each channel. The method may further include positioning one or more trim members, configured to be anchored to the concrete, on an upper surface of the concrete. The method may further include positioning one or more pattern stamps at least partially into an upper surface of the concrete.

Various example embodiments of the present general inventive concept may provide a method of forming a wall structure, the method including positioning a wall structure frame within a casting bed, placing uncured concrete within the casting bed and allowing the concrete to cover the wall structure frame, positioning one or more trim members, configured to be anchored to the concrete, on an upper surface of the concrete, and allowing the concrete to cure. The positioning of the one or more trim members may include pressing a plurality of anchoring extensions extending from a back surface of the one or more trim members into the concrete. The anchoring extensions may be configured as screws that are partially screwed into the back surface of the one or more trim members, the screws having screwheads with a larger diameter than a body of the screws. At least a portion of the anchoring extensions may be respectively positioned adjacent each edge of the one or more trim members. The one or more trim members may be formed of a composite material which is cut to a desired size for the wall structure, and may be covered with a sealant before being placed on the upper surface of the concrete.

Various example embodiments of the present general inventive concept may provide a method of forming a wall structure, the method including positioning a wall structure frame within a casting bed, placing uncured concrete within the casting bed and allowing the concrete to cover the wall structure frame, positioning one or more pattern stamps at least partially into an upper surface of the concrete, and allowing the concrete to cure. The method may further include removing the one or more pattern stamps from the upper surface of the concrete after the concrete has partially cured. The one or more pattern stamps may be configured to form a brick pattern, and the one or more pattern stamps may each be configured as a skeletal structure in which open spaces of the skeletal structure correspond to bricks of the brick pattern, and solid portions of the skeletal structure correspond to mortar between the bricks of the brick pattern.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept. Furthermore, while the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A method of forming a wall structure, the method comprising:
    positioning a frame within a casting bed having a plurality of upright surfaces defining a generally rectangular interior area, the frame comprising first and second spaced apart members extending fully along a width dimension of the casting bed and a plurality of studs interconnecting the first and second spaced apart members, the studs each extending fully along a length dimension of the frame;
    positioning a forming member in overlying relation above the frame, the forming member comprising a one-piece layer of insulating material sized to extend fully along the width dimension of the casting bed and fully along a width dimension of the frame and to fully cover and encapsulate the frame within the casting bed, the forming member defining a plurality of integrally-formed rectangular protrusions, each said integrally-formed rectangular protrusion having a length dimension extending fully along a length dimension of the forming member and fully along the length dimension of the frame in a parallel and spaced-apart relationship to one another to define a plurality of rectangular-shaped channels therebetween;
    placing uncured concrete within the casting bed and allowing the concrete to cover the forming member and substantially fill the channels;
    positioning one or more trim members, configured to be anchored to the concrete, on an upper surface of the concrete, wherein the one or more trim members are formed of a composite material which is cut to a desired size for the wall structure, and covered with a sealant before being placed on the upper surface of the concrete; and
    allowing the concrete to cure.

2. The method of claim 1, further comprising positioning the frame within the casting bed to provide a first space between the frame first member and a first upright surface of the casting bed and to provide a second space between the frame second member and a second upright surface of the casting bed.

3. The method of claim 2, further comprising positioning the forming member above the frame to provide a third space between the forming member and the first upright surface of the casting bed, and to provide a fourth space between the forming member and the second upright surface of the casting bed.

4. The method of claim 3, further comprising allowing uncured concrete to fill the first and third spaces to form a top beam portion of the wall structure and wherein uncured concrete is allowed to fill the second and fourth spaces to form a toe portion of the wall structure.

5. The method of claim 3, further comprising positioning a spacer between the frame first member and the third upright surface of the casting bed to form the first space.

6. The method of claim 5, the spacer being a strip of insulating material.

7. The method of claim 3, wherein the first and second upright surfaces of the casting bed define structures shaped to allow the concrete to form matingly-shaped portions of a joint along opposite sides of the wall structure.

8. The method of claim 7, the first upright surface defining a ridge extending along a length thereof, and the second upright surface defining a matingly-shaped groove extending along a length thereof.

9. The method of claim 1, further comprising positioning a plurality of reinforcing members within the casting bed prior to placing the uncured concrete within the casting bed.

10. The method of claim 9, wherein the positioning of a plurality of reinforcing members further comprises placing at least one reinforcing member along each channel.

11. The method of claim 1, further comprising positioning one or more pattern stamps at least partially into an upper surface of the concrete.

12. A method of forming a wall structure, the method comprising:
 positioning a wall structure frame within a casting bed;
 placing uncured concrete within the casting bed and allowing the concrete to cover the wall structure frame;
 positioning one or more trim members, configured to be anchored to the concrete, on an upper surface of the concrete; and
 allowing the concrete to cure;
 wherein the one or more trim members are formed of a composite material which is cut to a desired size for the wall structure, and covered with a sealant before being placed on the upper surface of the concrete.

13. The method of claim 12, wherein the positioning of the one or more trim members comprises pressing a plurality of anchoring extensions extending from a back surface of the one or more trim members into the concrete.

14. The method of claim 13, wherein the anchoring extensions are configured as screws that are partially screwed into the back surface of the one or more trim members, the screws having screwheads with a larger diameter than a body of the screws.

15. The method of claim 13, wherein at least a portion of the anchoring extensions are respectively positioned adjacent each edge of the one or more trim members.

16. A method of forming a wall structure, the method comprising:
 positioning a wall structure frame within a casting bed;
 placing uncured concrete within the casting bed and allowing the concrete to cover the wall structure frame;
 positioning one or more trim members, configured to be anchored to the concrete, on an upper surface of the concrete, wherein the one or more trim members are formed of a composite material which is cut to a desired size for the wall structure, and covered with a sealant before being placed on the upper surface of the concrete;
 positioning one or more pattern stamps at least partially into an upper surface of the concrete; and
 allowing the concrete to cure.

17. The method of claim 16, further comprising removing the one or more pattern stamps from the upper surface of the concrete after the concrete has partially cured.

18. The method of claim 16, wherein the one or more pattern stamps are configured to form a brick pattern, the one or more pattern stamps each being configured as a skeletal structure in which open spaces of the skeletal structure correspond to bricks of the brick pattern, and solid portions of the skeletal structure correspond to mortar between the bricks of the brick pattern.

* * * * *